United States Patent [19]
Yoshida et al.

[11] Patent Number: 5,226,149
[45] Date of Patent: Jul. 6, 1993

[54] A SELF-TESTING MICROPROCESSOR WITH MICROINSTRUCTION SUBSTITUTION

[75] Inventors: Toyohiko Yoshida; Yuichi Saito, both of Itami, Japan

[73] Assignee: Mitsubishi Denka Kabushiki Kaisha, Tokyo, Japan

[21] Appl. No.: 531,263

[22] Filed: May 31, 1990

[30] Foreign Application Priority Data

Jun. 1, 1989 [JP] Japan .................................. 1-141543

[51] Int. Cl.⁵ ............................................. G06F 11/00
[52] U.S. Cl. .................................... 395/575; 395/375; 371/16.1; 371/15.1; 364/944.9; 364/DIG. 1; 364/256.6
[58] Field of Search ............... 395/325, 375; 371/16.1, 371/15.1; 364/580

[56] References Cited

U.S. PATENT DOCUMENTS

| | | | |
|---|---|---|---|
| 3,921,142 | 11/1975 | Bryant et al. | 340/172.5 |
| 3,924,110 | 12/1975 | Cochran et al. | 364/706 |
| 4,302,445 | 12/1981 | Tredennick et al. | 395/375 |
| 4,402,042 | 8/1983 | Guttag | 364/200 |
| 4,482,953 | 11/1984 | Burke | 371/19 |
| 4,490,783 | 12/1984 | McDonough et al. | 364/200 |
| 4,507,727 | 3/1985 | Magar | 364/200 |
| 4,641,308 | 2/1987 | Sacarisen et al. | 371/16.1 |
| 4,811,345 | 3/1989 | Johnson | 371/16.1 |
| 5,084,814 | 1/1992 | Vaglila et al. | 395/325 |

OTHER PUBLICATIONS

"Testing Approaches in the MC68020", Kuban, et al., Motorola, Inc., VLSI Design, Nov. 1984, pp. 22–30.

Primary Examiner—Thomas C. Lee
Assistant Examiner—L. Donaghue
Attorney, Agent, or Firm—Townsend and Townsend Khourie and Crew

[57] ABSTRACT

A microprocessor having a test mode wherein a test instruction including an instruction for executing a diagnosing microprogram routine which tests each function block inside of the microprocessor and an instruction which makes data scan in to various latches such as a latch at output portion of the micro ROM for easily diagnosing each internal function blocks by independently operating them, and the latch at the output portion of the micro ROM is allocated an address and is constituted to be loaded in and to store the data from outside of the microprocessor. A diagnosing instruction is loaded from the outside of the microprocessor and the microinstruction of an address allocated the latch is executed, thereby the cause of a fault in the microprocessor can be easily diagnosed.

5 Claims, 31 Drawing Sheets (ADDRESS)

←LOW ADDRESS                  HIGH ADDRESS→ /202

←MSB SIDE                            LSB SIDE→

→→DIRECTION OF READ INSTRUCTION→→

Fig. 26

```
IRL                                    D
0 1 2 00 01    05 06    10 11    15 16   19 20              31
┌─────┬──────┬──────┬──────┬──┬──┬──────────────────┐
│ 100 │ TPAR │ SREG │ DREG │ZS│ZD│ MICRO ROM ADDRESS│
└─────┴──────┴──────┴──────┴──┴──┴──────────────────┘
   MM
```

Fig. 27

```
IRL                                    D
0 1 2 00                            19 20              31
┌─────┬──────────────────────────┬──────────────────┐
│ 101 │       don't care         │ MICRO ROM ADDRESS│
└─────┴──────────────────────────┴──────────────────┘
```

Fig. 28

```
IRL                                    D
0 1 2 00 01    05 06    10 11    15 16   19 20              31
┌─────┬──────┬──────┬──────┬──┬──┬──────────────────┐
│ 110 │ TPAR │ SREG │ DREG │ZS│ZD│ MICRO ROM ADDRESS│
└─────┴──────┴──────┴──────┴──┴──┴──────────────────┘
   MM
```

Fig. 29

```
IRL                                    D
0 1 2 00                            19 20              31
┌─────┬──────────────────────────┬──────────────────┐
│ 111 │       don't care         │ MICRO ROM ADDRESS│
└─────┴──────────────────────────┴──────────────────┘
```

Fig. 30

```
IRL                       D
0 1 2 00                   19 20        31
┌───┬────────────────────────────────────┐
│010│          OPERAND DATA              │
└───┴────────────────────────────────────┘
```

Fig. 31

```
IRL                       D
0 1 2 00 01                19 20        31
┌───┬────────────────────────────────────┐
│000│          don't care                │
└───┴────────────────────────────────────┘
    DD
```

Fig. 37

```
IRL
0    3 4 5    9 10   14 15   19 20 22 24          31
┌────┬─┬──────┬──────┬──────┬───┬──┬───────────────┐
│OP1 │ │ OP2  │  RS  │  RD  │WS │WD│HIGHER 8 BITS OF│
│    │ │      │      │      │   │  │MICRO ADDRESS   │
└────┴─┴──────┴──────┴──────┴───┴──┴───────────────┘
       MW
```

Fig. 38

| PROCESSOR INSTRUCTION | OP1 | MW | OP2 | RS | RD | WS | WD | MICRO ROM ADDRESS |
|---|---|---|---|---|---|---|---|---|
| MOV.W R2,MEM | 0000 | 1 | 00011 | 00010 | 11000 | 10 | 10 | 00000000 |
| CMP.B R8,R0 | 0000 | 0 | 10011 | 00100 | 00000 | 00 | 00 | 00000010 |
| ADD.W MEM,R2 | 0000 | 0 | 11011 | 10111 | 00010 | 10 | 10 | 00000000 |
| SHA.W #2,R0 | 0000 | 0 | 10011 | 10110 | 01111 | 00 | 10 | 00000100 |
| MUL.H R7,R15 | 0000 | 0 | 10011 | 00111 | 01111 | 01 | 01 | 00100100 |
| JMP @(R3) | 0001 | 0 | 00000 | 00011 | 10000 | 10 | 10 | 00001100 |

Fig. 39

| TEST INSTRUCTION | MM | TPAR | SREG | DREG | WS | WC | MICRO ROM ADDRESS |
|---|---|---|---|---|---|---|---|
| TESTALUOPE | — | — | — | — | — | — | 1000000000000 |
| TESTAADD | — | — | — | — | — | — | 1000100000000 |
| TCMP.B R8,R0 | 0 | 10011 | 00100 | 00000 | 00 | 00 | 0000001000000 |
| S3MUL.H R7,R15 | 0 | 10011 | 00111 | 01111 | 01 | 01 | 0010010000011 |
| OUTPUT R3 | 1 | 00011 | 00011 | 11100 | 10 | 10 | 1100000000000 |
| INPUT R5 | 0 | 00011 | 10101 | 00101 | 10 | 10 | 1100000000000 |

Fig. 41

| FIELD NO. | NUMBER OF BITS | CONTENT |
|---|---|---|
| 1 | 8 | SPECIFY SOURCE OPERAND 1 TO BE OPERATED |
| 2 | 7 | SPECIFY SOURCE OPERAND 2 TO BE OPERATED |
| 3 | 9 | SPECIFY STRING ADDRESS OF OPERATION RESULT |
| 4 | 15 | CONTROL INFORMATION RELATED TO MEMORY ACCESS |
| 5 | 6 | SPECIFY SIZE OF OPERAND TO BE OPERATED |
| 6 | 24 | CONTROL INFORMATION RELATED TO OPERATION USING VARIOUS OPERATION UNIT |
| 7 | 12 | CONTROL INFORMATION RELATED TO STATUS FLAG |
| 8 | 15 | CONTROL INFORMATION RELATED TO EXCEPTION PROCESSING |
| 9 | 10 | ADDRESS INFORMATION OF MICROINSTRUCTION |
| 10 | 6 | SPECIFY MICROSEQUENCE |

Fig. 42

| BIT PATTERN | CONTENT |
|---|---|
| 1***** | CONDITIONAL JUMP ACCORDING TO LOWER 5 BITS |
| 010000 | SUBROUTINE JUMP |
| 010001 | RETURN FROM SUBROUTINE |
| 011*** | CONDITIONAL FINISH ACCORDING TO LOWER 3 BITS |
| 010100 | ADVANCE TO NEXT ADDRESS |
| 010111 | FINISH OF MICROPROGRAM ROUTINE |

A SELF-TESTING MICROPROCESSOR WITH MICROINSTRUCTION SUBSTITUTION

Cross-reference is hereby made to applications Ser. Nos. 07/531,267 and 07/531,482, both filed on May 31, 1990 and assigned to the assignee herein.

BACKGROUND OF THE INVENTION

1. Field of the Invention

The present invention relates to a microprocessor, more particularly, it relates to a microprocessor which executes instructions at a high speed in normal mode by applying pipeline processing, and at a testing, the microprocessor diagnoses all the internal function blocks by executing test instruction based on the dedicated mode exclusively available for executing test, so that a test of the microprocessor is done with ease.

2. Description of Related Art

Generally, any conventional microprocessor incorporates an instruction set of a single system. In order to execute the instruction set at an extremely fast speed, the interior of such a conventional processor is divided into a plurality of function blocks, in which respective function blocks are operated in parallel with each other based on the principle of pipeline processing.

FIG. 1 illustrates an example of the simplified block diagram of the whole structure of a conventional microprocessor.

The reference numeral 101 shown in FIG. 1 designates an instruction fetch unit which delivers an address to a memory external to the microprocessor via an address output circuit 108, and then fetches an instruction via a data input/output circuit 109.

The reference numeral 102 designates an instruction decoding unit which decodes the instruction received from the instruction fetch unit 101, and then outputs information needed to executing the received instruction.

The reference numeral 103 designates an instruction execution control unit. The instruction execution control unit 103 outputs a microprogram entry address, which is outputted from the instruction decoding unit 102, to a microprogram counter 106, and controls an instruction execution unit 105 according to a microinstruction read out from a micro ROM 107 based on an address outputted from the microprogram counter 106, and information such as a general purpose register number, a literal operand and a data size outputted from the instruction decoding unit 102 in order to execute the instruction decoded in the instruction decoding unit 102. Using the microinstruction outputted from the micro ROM 107 by addresses sequentially indicated by the microprogram counter 106 and other information outputted from the instruction decoding unit 102, the instruction execution control unit 103 controls an instruction execution unit 105 to execute instructions.

The reference numeral 104 designates an operand access unit. In the case where an operand needed for executing instructions is stored in memory, the operand access unit 104 fetches the needed operand through the data input/output circuit 104 by outputting an address of the needed operand to the memory external to the microprocessor via address output circuit 108.

In the case where an operand should be stored in the memory, the operand access unit 104 outputs the operand address to the memory external to the microprocessor via the address output circuit 108 and delivers the operand to the memory via the data input/output circuit 109 in order to store the operand in the memory.

Those function blocks including the instruction fetch unit 101, instruction decoding unit 102, and the instruction execution unit 105 operate themselves in parallel and in association with each other, and based on the principle of pipeline processing, these function units simultaneously execute a plurality of instructions.

U.S. Pat. No. 4,402,042 entitled "MICROPROCESSOR SYSTEM WITH INSTRUCTION PREFETCH" discloses such a microprocessor featuring enhanced performance capable of simultaneously executing a plurality of instructions by applying pipeline processing.

Independent of the instruction system for pipeline processing for achieving higher performance mentioned above, such a conventional microprocessor capable of executing such an instruction system for utilizing existing software is also well known. As example of such microprocessor was introduced in the "NIKKEI ELECTRONICS, on pages 199 through 204, in Vol. No. 391, issued on Mar. 24, 1986, by Sato et al, entitled "32-bit microprocessor V60 incorporating virtual memory control system and floating point operation function".

When testing respective function blocks, any conventional microprocessor self-diagnoses the operation of the microprocessor by applying either an instruction system for achieving higher performance of pipeline processing like the one cited above or by applying such an instruction system utilizing the existing software. Either of these instruction systems allows a plurality of function blocks inside of the microprocessor to operate themselves in parallel with each other by applying pipeline processing. When executing instructions, since respective function blocks operate themselves in association and in parallel with each other, the size of the operational pattern significantly increases. And yet, since the microprocessor is composed on a single LSI chip, it is extremely difficult to measure the voltage or current of nodes other than those connected to external pins of the chip. From the standpoint of saving testing costs, it is desired that the microprocessor be testable by the application of Test data to the external pins only.

In order to diagnose each function block of a microprocessor, it is necessary for the test system to preliminarily execute an instruction which initializes the content of various latches inside the microprocessor or the test system must operate by combining these instructions so that those function blocks other than those which are subject to diagnosis cannot adversely affect the diagnosing operation. Actually, the design of a test program is extremely difficult, and a number of manhours are needed for designing the test program. In particular, it is extremely difficult for testers to precisely detect the cause of an incorrect operation of an experimentally assembled microprocessor when it does not function as designed.

As a means for solving the above problem and easily executing the diagnostic test of an LSI like a microprocessor, a test method has been proposed, which connects the latches inside of the LSI by means of shift path and uses a scan path for causing the latch content to be input and output serially. This proposal was introduced in the "NIKKEI ELECTRONICS", issued on Apr. 18, 1979, on pages 57 through 68, by Tanaka, entitled A Method of Significantly Improving the Detect Rate of Failure of LSI by Applying a Circuit Structure Capable of Easily Executing Test, for example.

There is much significance in the execution of a test of an LSI using the scan path because the values of latches in the LSI can be read and written. Nevertheless, this test method still accompanies these problems to be solved including the need for combining those latches requiring read and write in the course of designing LSI and the problem of much hardware volume needed for changing-over scan path operation and operation of using set value by the scan path operation.

Another test method is also proposed to avoid increasing volume of the hardware by adopting a scan path. After turning the microprocessor into the test mode, this method executes a test of a programmable logic array (PLA), or a ROM, or a cache as an internal memory effectively using internal construction of the microprocessor, or using diagnosing microprogram routine. Such a test method is disclosed in J. R. Kurban and J. E. Salick, "Testing Approaches in the MC68020", VLSI DESIGN, Vol. V, No.11, on pages 22 through 30, November, 1984, for example.

In the above proposed test method, only the diagnosing microprogram routine which is previously stored in the micro ROM can be used because the method which starts the diagnosing microprogram routine by a specified instruction is adopted. Accordingly, when investigating microprocessor faults, it is desirable to execute test instructions corresponding to the cause of the fault, but there is no flexibility in the above test method. Also, in the above test method, microinstructions which are not stored in the micro ROM can not be executed at all, so that more precise diagnostics are not possible.

As cited above, various prior art has been proposed for easily executing a test for microprocessors. Nevertheless, the prior art merely presents methods of partly solving the pending issue. Actually, no art has ever been proposed to thoroughly overcome the difficulty in the detection of the cause of a partial failure occurring in a microprocessor.

It is essential for a manufacturer to repeatedly execute trial production of microprocessors before completing the design of a final product allowing the manufacturer to enter into mass production after overcoming design bugs caused by erroneous microprograms and logical design errors and the lowered yield rate caused by short-circuits between distributed wires as a result of small margins of error in the designed mask pattern. It is extremely important for the manufacturer to detect the cause of failure of a microprocessor as early as possible.

In order to specify a point having too small a margin on the LSI, it is essential for the manufacturers to test by various test programs as many trial products as possible before specifying the point having high potential of causing fault to occur. For this purpose, manufacturers should also quickly design various test programs according to the kinds of failure. In consequence, if the test program could not easily be designed, manufacturers will be obliged to sustain a large number of man-hours before finalizing the design of test programs.

SUMMARY OF THE INVENTION

The primary object of the present invention is to provide a novel microprocessor which allows a test program to be designed very easily, saves the time needed for implementing the design by promoting flexibility in order that the time necessary for designing the test program can eventually be decreased.

The microprocessor embodied by the present invention characteristically has two operational modes including a processor mode executing instructions based on pipeline processing, wherein the processor mode operates a plurality of function blocks including the instruction fetch unit, instruction decoding unit, data operation unit, and others, in association and in parallel with each other, and the other test mode which facilitates self-diagnosis of the microprocessor itself by independently operating those function blocks inside of the microprocessor. In addition, the microprocessor embodied by the present invention incorporates two sets of instructions including a processor instruction used for executing the processor mode at high speed in the course of the processor mode by applying pipeline processing and a test instruction used for executing diagnostic operations under the test mode.

The test instruction set includes various instructions such as an instruction which executes a diagnosing microprogram routine for testing each function block in the microprocessor, an instruction which makes data scan in to various latches such as a latch at an output portion of the micro ROM inside the microprocessor, and the like.

The latch at the output portion of the micro ROM is allocated one micro ROM address, and can store an microinstruction loaded from an external source. By executing the microinstruction of that address, the microinstruction being latched at that latch is executed.

When the processor mode is activated, respective function blocks inside the microprocessor of the present invention operate in association and in parallel with each other so that the processor instructions can be executed at a high speed according to the principle of pipeline processing. In the meantime, the microprocessor of the present invention starts a memory access cycle and outputs addresses to the external memory, and as a result, processor instructions and operand data in the corresponding address positions are fetched. The processor mode is used when activating operations proper to the microprocessor by connecting it to the external memory and also when testing using an LSI tester.

When the test mode is activated, the test instruction directly specifying the microprogram entry address is fetched by bypassing the instruction decoder to be executed. While the test mode is underway, the test instruction is fetched when a signal is asserted without starting the memory access cycle. Test results can be obtained by driving the address output circuit and independent of memory cycle. Primarily, the test mode is used for testing the microprocessor of the present invention using an LSI tester.

In the case where a microinstruction which is not stored in the micro ROM is required in order to specify a fault point of the microprocessor, microinstructions are loaded from exterior to and latched in the latch at the output portion of the micro ROM and the microinstruction of the micro ROM address allocated to the latch is executed, thereby cause of fault is diagnosed by the microinstruction inputted from exterior of the microprocessor.

The above and further objects and features of the invention will more fully be apparent from the following detailed description with accompanying drawings.

BRIEF DESCRIPTION OF THE DRAWINGS

FIGS. 26, 27, 28, 29, 30 and 31 are schematic diagrams showing patterns which explain the format of the test instruction of the microprocessor of the present invention, FIG. 37 is a schematic diagram showing a format of the R code of the decoded result of the processor instruction of the microprocessor of the present invention, FIG. 38 is a schematic diagram showing an example of the R code of the decoded result of the processor instruction of the microprocessor of the present invention, FIG. 39 is a schematic diagram showing an example of a test instruction of the processor instruction of the microprocessor of the present invention, FIG. 41 is a schematic diagram showing a microprogram field of the microprocessor of the present invention, FIG. 42 is a schematic diagram showing a sequence field of the microinstruction of the microprocessor of the present invention.

DESCRIPTION OF THE PREFERRED EMBODIMENTS

Figure 1:
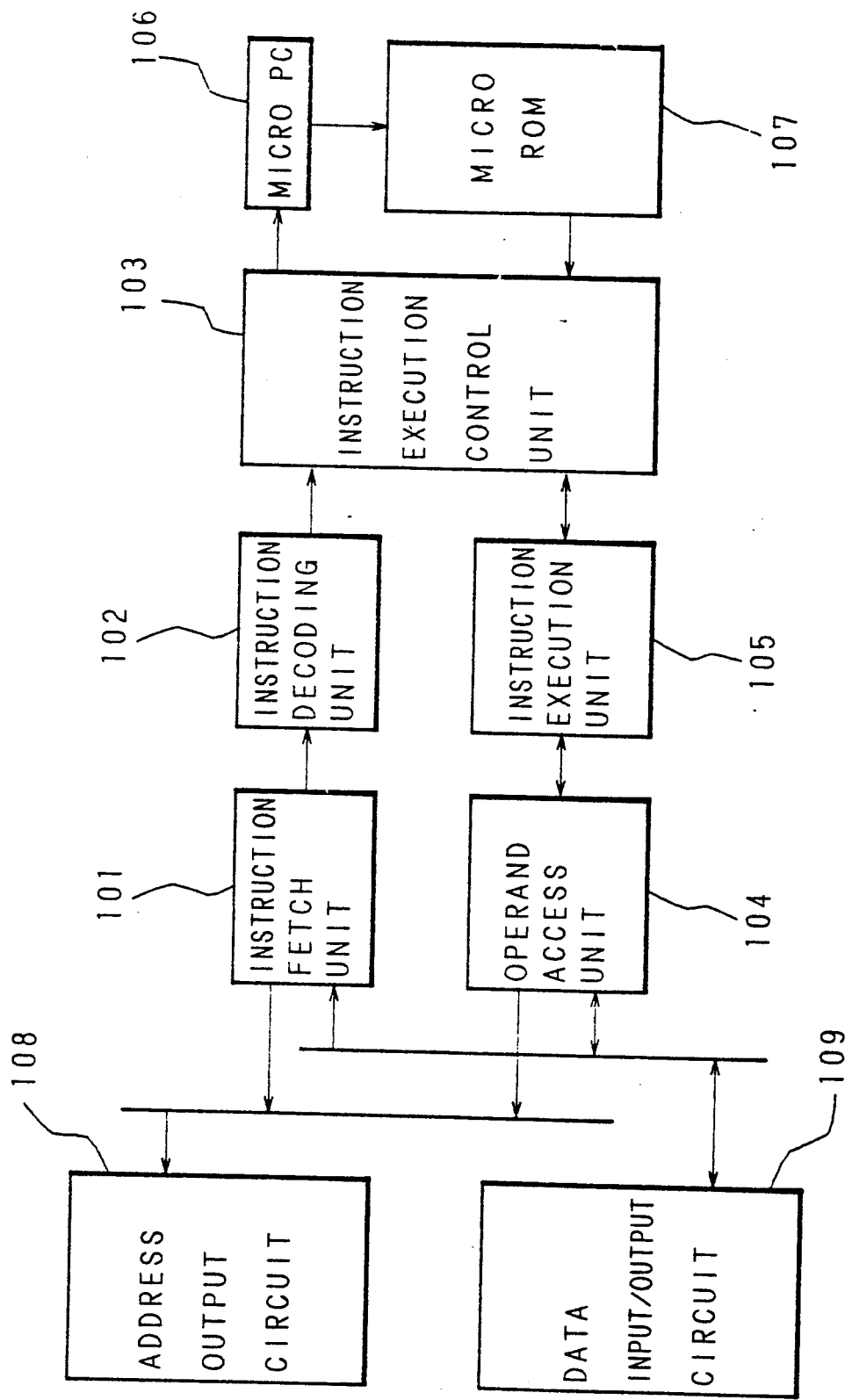
FIG. 1 is a simplified block diagram showing an example of a conventional microprocessor.

Referring now more particularly to the accompanying drawings, preferred embodiments of the invention are described below.

(1) "Operation Modes of Microprocessor of the Present Invention"

The microprocessor embodied by the present invention has two operation modes. The first is a processor mode which is mainly used for executing pipeline processing at a very fast speed, and the second one is a test mode mainly used for diagnosing the internal state of the microprocessor of the present invention.

Furthermore, the microprocessor embodied by the present invention is characteristically capable of executing two kinds of instruction sets including a first instruction set comprising the processor instruction set to be executed in the course of the processor mode and a second instruction set comprising the test instruction set to be executed in the course of the test mode, respectively.

When the processor mode is underway, the microprocessor of the present invention executes the processor instructions at a very fast speed by applying pipeline processing. The processor mode is used when executing various software at a very fast speed using the microprocessor of the present invention. When the processor mode is underway, only the processor instructions are executed without allowing the test instructions to be executed at all.

When the test mode is underway, based on a non-pipeline processing, the test instructions are sequentially executed. Self-diagnosis of the microprocessor can more easily be executed during the test mode than the case of applying the processor mode. Primarily, the test mode is used for testing the microprocessor with an LSI tester.

When the processor mode is entered, the microprocessor of the present invention outputs addresses to a memory in order to fetch instructions and data, and then outputs the operational results to the memory together with the address at which the operation results are stored. On the other hand, when the test mode is entered, the microprocessor outputs the operation results against given instruction and data. Nevertheless, the microprocessor does not output the address for fetching instruction and data.

(2) "Format of Processor Instruction of the Microprocessor of the Present Invention"

A processor instruction of a microprocessor of the present invention is formed on a 16-bit unit basis, being variable in length. No processor instruction with an odd number of bytes is used herein.

The microprocessor of the present invention has an instruction format system specifically devised for the purpose of writing more frequently used processor instructions in a shorter format than infrequently used instructions. For example, as to a two-operand instruction, two formats are provided; a general format which has basically a configuration of "four bytes+extension part(s)" and allows the utilization of all addressing modes and a short format allowing only the use of a highly frequent instruction and an addressing mode.

FIG. 2 through FIG. 11 are schematic diagrams showing processor instruction formats of the microprocessor of the present invention.

The meanings of symbols appearing in the instruction format of the microprocessor of the present invention shown in FIG. 2 to FIG. 11 are as follows:

—: Field wherein an operation code is put.
: Field wherein a literal or an immediate value is put.
Ea: Field for generating an operand in a general-type 8-bit addressing mode.
Sh: Field for designating an operand in a short-type 6-bit addressing mode.
Rn: Field for designating an operand in a register by the register number.

Figure 2:
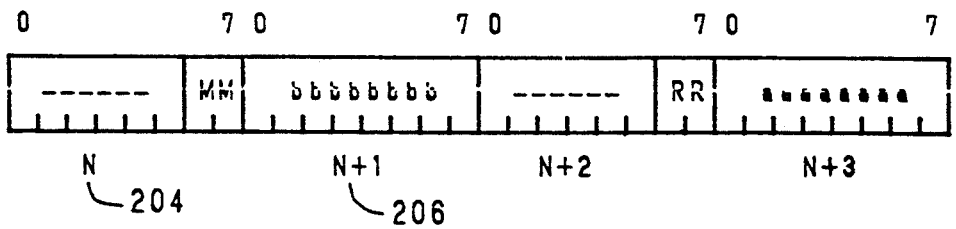
FIG. 2 is a schematic diagram showing an arrangement of instructions in the memory of the microprocessor of the present invention.

In the format, as shown in FIG. 2, the right side 202 is the LSB side and is high address. The instruction format can be discriminated only after an address N 204 and an address N+1 206 are checked. As described above, this is because of a premise that the instruction is fetched and decoded on a 16-bit (2-byte) unit basis without fail.

In the processor instruction of the microprocessor of the present invention, in the case with any format, the extension part of Ea or Sh of each operand is sure to be positioned immediately after a half word comprising the basic part of that Ea or Sh. This takes precedence over the immediate data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next operation field. For example, consideration is made on the case of 6-byte instruction which comprises Ea1 in a first half word, Ea2 in a second half word, and ends with a third half word. Since the chained addressing mode is used for Ea1, another extension part of the chained addressing mode is assumed to be attached in addition to the ordinary extension part, and then the actual instruction bit pattern is composed in the sequence of the first half word of instruction (including the basic part of Ea1), the expansion part of Ea1, the chained addressing mode extension part, the second half word of instruction (including the basic part of Ea2), the expansion part of Ea1 and the third half word of instruction.

(2.1) "Short-Format Two-Operand Instruction"

FIG. 3 through FIG. 6 are schematic diagrams showing short formats of the two-operand processor instruction.

Figure 3:
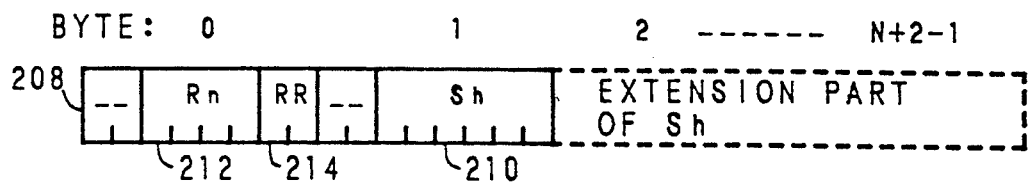
FIGS. 3, 4, 5, 6, 7, 8, 9, 10 and throguh FIG. 11 are schematic diagrams showing formats of processor instructions of the microprocessor of the present invention.

FIG. 3 is a schematic diagram showing a format 208 of an operational instruction between memory and register. This format includes a L-format wherein the source operand side is a memory and a S-format wherein the destination operand side is a memory.

In the L-format, symbol Sh 210 represents the designating field of the source operand, symbol Rn 212 represents the designating field of the register of the destination operand and RR 214 represents designating of the operand size of Sh 210, respectively. The size of the destination operand located in the register is fixed to 32 bits. Where the size of the register side differs from that of the memory side and the size of the source side is smaller, sign extension is performed.

In the S-format, symbol Sh 210 represents the designating field of the destination operand, symbol Rn 212 represents the register designating field of the source operand and RR 214 represents designating of the operand size of Sh 210, respectively. The size of the source operand located in the register is fixed to 32 bits. Where the size of the register side differs from that of the memory side and the size of the source side is larger, truncating of the overflow portion and overflow check are performed.

Figure 4:
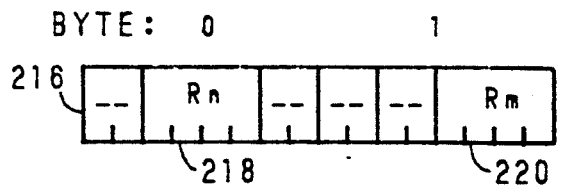

FIG. 4 is a schematic diagram showing a format 216 of an operational instruction between register and register (R-format). Symbol Rn 218 represents the designating field of the destination register, and symbol Rm 220 represents the designating field of the source register. The operand size is 32 bits only.

Figure 5:
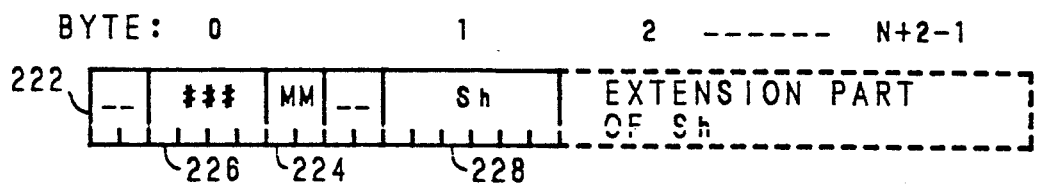

FIG. 5 is a schematic diagram showing a format 222 of an operational instruction between literal and memory (Q-format). Symbol MM 224 represents the designating field of the destination operand size, symbol ### 221 represents the designating field of the source operand by literal, and symbol Sh 228 represents the designating field of the destination operand.

Figure 6:
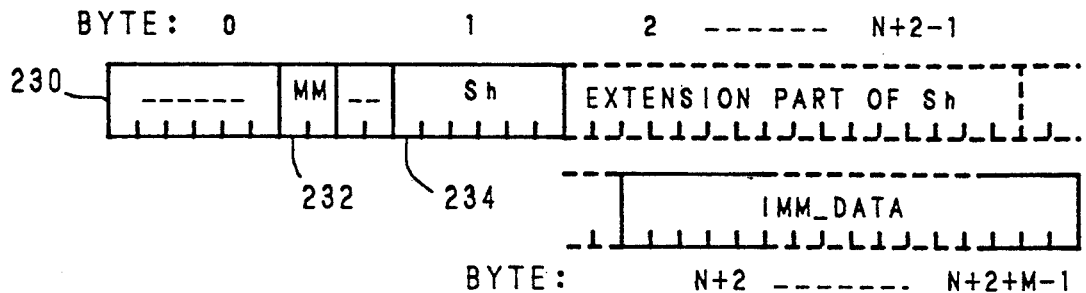

FIG. 6 is a schematic diagram showing a format 230 of an operational instruction between immediate and memory (I-format). Symbol MM 232 represents the designating field of the destination operand size (common in source and destination), and symbol Sh 234 represents the designating field of the destination operand. The size of the immediate of the I-format are 8 bits, 16 bits, and 32 bits in common with the sizes of the operand of the destination side, and zero extension and sign extension are not performed.

(2.2) "General-Format One-Operand Instruction"

Figure 7:
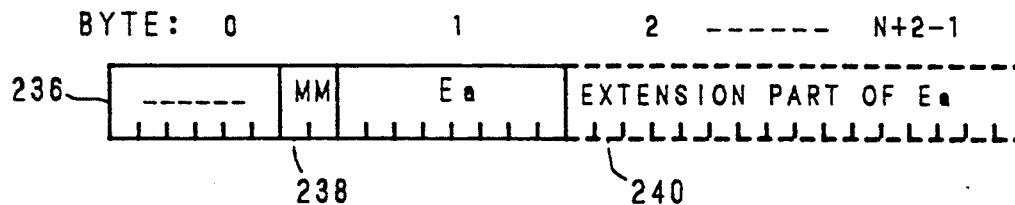

FIG. 7 is a schematic diagram showing a general-type format 236 of one-operand instruction (G1-format) of the processor instruction. Symbol MM 238 represents the designating field of the operand size. Some of the G1-format instructions comprise an extension part besides the extension part of Ea 240. There are also instructions using no MM 238.

(2.3) "General-Format Two-Operand Instruction"

Figure 8:
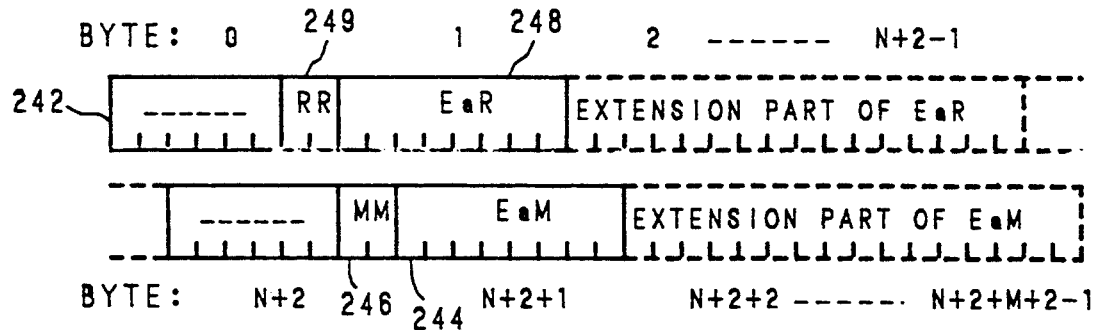
Figure 9:
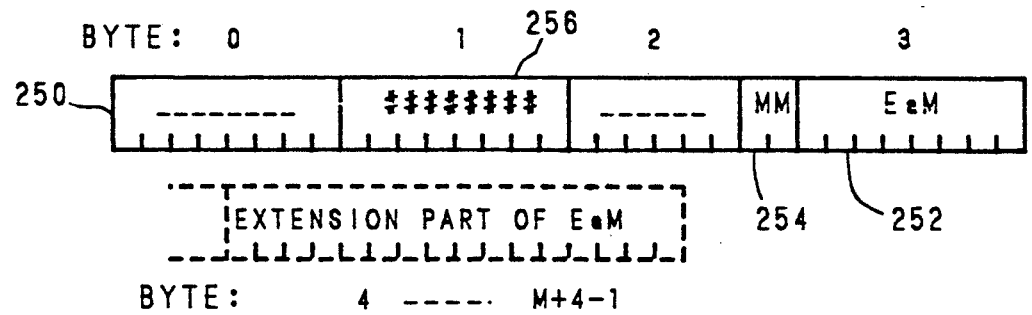
Figure 10:
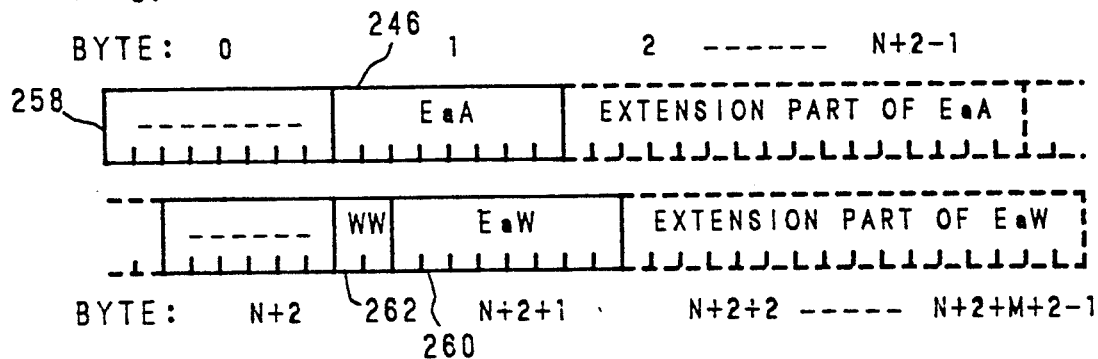

FIG. 8 through FIG. 10 are schematic diagrams showing general formats of two-operand instruction of the processor instruction. This format comprises an instruction having a maximum of two operands of the general-type addressing mode which are designated by eight bits. There are cases where the total number of operands becomes three or more.

FIG. 8 is a schematic diagram showing a format 242 of an instruction wherein a first operand necessitates memory read-out (G-format). Symbol EaM 244 represents the designating field of the destination operand, symbol MM 246 represents the designating field of the destination operand size, EaR 248 represents the designating field of the source operand, and RR 249 represents the designating field of the source operand size. Some of the G-format instructions comprise an extension part besides the extension part of EaR 248.

FIG. 9 is a schematic diagram showing a format 240 of an instruction wherein a first operand is an instruction of eight-bit immediate (E-format). Symbol EaM 252 represents the designating field of the destination operand, symbol MM 254 represents the designating field of the destination operand seize, And symbol ##... 256 represents the source operand value.

The E-format and the I-format have similar function, but their conceptions greatly differ from each other, Specifically, the E-format is coherently of a type derived from the general two-operand type (G-format), the size of source operand is eight-bit fixed, and the seize of the destination operand is selected from among 8, 16 and 32 bits. This means that the E-format presupposes an operation between different seizes, and the source operand of eight bits is zero-extended or sign-extended in a manner of agreeing with the size of the destination operand.

On the other hand, the I-format is of a type that the patterns of immediate having high frequency, particularly in transfer instruction and the comparison instruction, are shortened, and the size of the source operand and the destination operand are equal.

FIG. 10 is a schematic diagram showing a format 258 of an instruction wherein a first operand is only an address calculation. Symbol EaW 260 represents the designating fields of the destination operand, symbol WW 262 represents the designating fields of the destination operand size, and symbol EaA 264 represents the designating field of the source operand. For the source operand, the calculation result itself of effective address is used.

Figure 11:
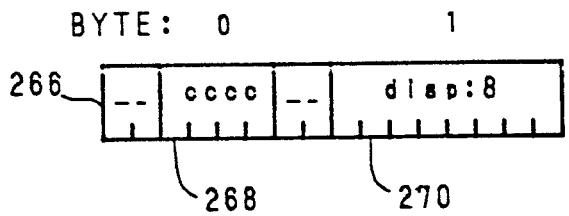

FIG. 11 is a schematic diagram showing a format 266 of a short branch instruction. Symbol cccc 268 represents the designating field of a branch condition, symbol disp: 8 270 represents the designating field of displacement to a jump destination, and in the microprocessor of the present invention, when displacement is designated by eight bits, the displacement value is set by doubling the designated value in the bit pattern.

(2.4) "Addressing Mode"

The methods of designating the addressing mode of the processor instruction of the microprocessor of the present invention include the short type designated by six bits including the register and the general type designated by eight bits.

Where an undefined addressing mode has been designated, or where a combination of addressing modes obviously unsuitable has been designated, a reserve instruction exception is generated, likewise, the case where the undefined instruction has been executed, and exception processing is started.

Example of these cases are the case where the destination is the immediate mode and the case where the immediate mode is used in the designating field of the addressing mode to be accompanied by address calculation.

Meanings of symbols used in the format diagram shown in FIG. 12 to FIG. 22 is as follows:
Rn: Register designating
(Sh): Designating method by the short-type addressing mode of six bits
(Ea): Designating method by the general-type addressing mode of eight bits In the format diagram, the portion surrounded by a broken line shows the extension part.

(2.4.1) "Basic Addressing Modes"

The processor instruction of the microprocessor of the present invention supports various addressing modes. Among them, the basic addressing modes supported by the processor instruction of the microprocessor of the present invention include a register direct mode, a register indirect mode, a register relative indirect mode, an immediate mode, an absolute mode, a Program Counter (PC) relative indirect mode, a stack pop mode and a stack push mode.

Figure 12:
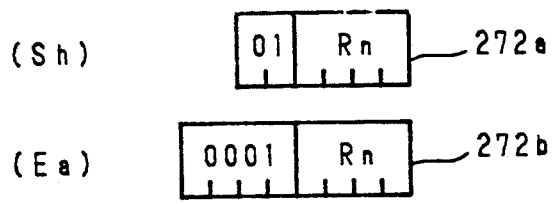
FIGS. 12, 13, 14, 15, 16, 17, 18, 19, 20, 21, 22, 23, 24 and FIG. 25 are schematic diagrams showing patterns which explain the addressing modes of the processor instruction of the microprocessor of the present invention.

The register direct mode takes the content of a register intact as an operand. FIG. 12 is a schematic diagram of the format thereof. Each symbol Rn 272a, 272b shows the number of the general-purpose register.

Figure 13:
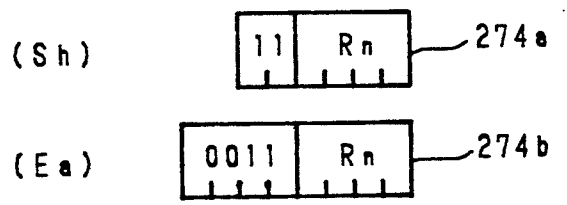

The register indirect mode takes as an operand the content of the memory whose address is the content of a register. FIG. 13 is a schematic diagram of the format thereof. Each symbol Rn 274a, 274b shows the number of the general-purpose register.

Figure 14:
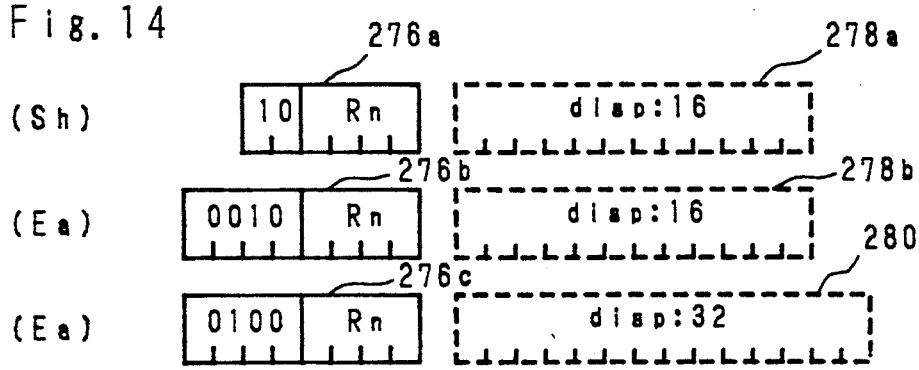

The register relative indirect mode includes two kinds (16 bits and 32 bits) of the displacement value. Each of them takes as an operand the content of the memory whose address is the value of the content of the register added to the displacement value of 16 bits or 32 bits. FIG. 14 is a schematic diagram of the format thereof. Each symbol Rn 276a, 276b, 276c shows the number of the general-purpose register. Each symbol disp:16 278a, 278b and disp:32 280 shows the displacement value of 16 bits and the displacement value of 32 bits, respectively. The displacement value is handled with a signed binary number.

Figure 15:
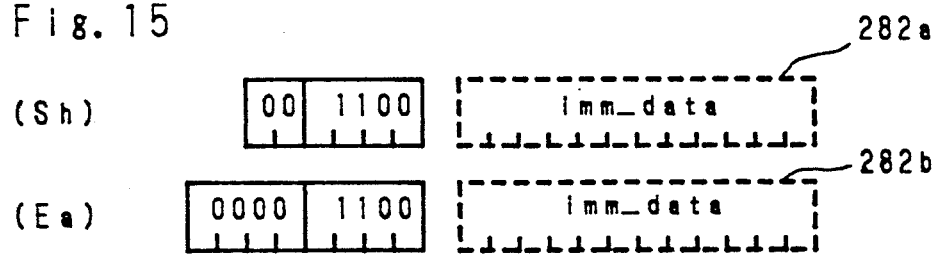

The immediate mode takes as an operand the bit pattern designated in the instruction code while assuming it intact as a binary number. FIG. 15 is a schematic diagram of the format thereof. Each symbol imm_data 282a, 282b shows the immediate. The size of imm_data is designated in the instruction as the operand size.

Figure 16:
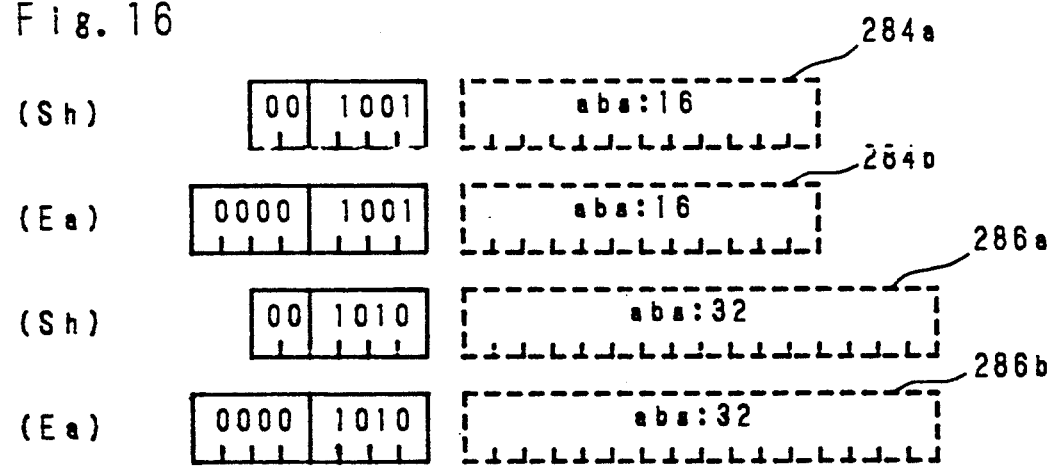

The absolute mode includes two kinds of field (16 bits and 32 bits) for showing the address value. Each kind takes as an operand the content of the memory whose address is the bit pattern of 16 bits or 32 bits designated in the instruction code. FIG. 16 is a schematic diagram showing the format thereof. Each symbol abs:16 284a, 284b and abs:32 286a shows the address value of 16 bits and 32 bits, respectively. When the address is shown by abs:16, the designated address value is sign-extended to 32 bits.

Figure 17:
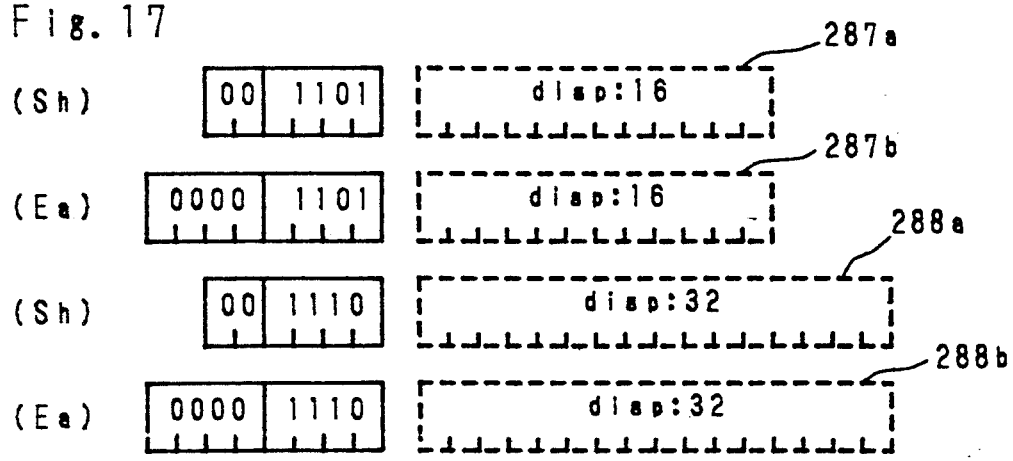

The PC relative indirect mode includes two kinds of field (16 bits and 32) for bits of the displacement value. Each takes as an operand the content of the memory whose address is the value of the content of a program counter whereto the displacement value of 16 bits or 32 bits is added. FIG. 17 is a schematic diagram showing the format thereof. Each symbol disp:16 286a, 286b and disp:32 288a, 288b shows the displacement value of 16 bits and the displacement value of 32 bits, respectively. The displacement value is handled with a signed binary number. In the PC relative indirect mode, the value of the program counter to be referred is the start address of the instruction comprising the operand. Where the value of the program counter is referred in the chained addressing mode, the start address of the instruction is also used as a reference value of PC relativity.

Figure 18:
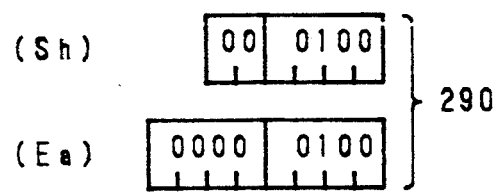

The stack pop mode takes as an operand the content of the memory whose address is the content of a stack pointer (SP). After operand access, the SP is incremented by the operand size. For example, where 32-bit data is handled, the SP is renewed (incremented) by +4 after the operand access. Designating of the stack pop mode for operands of sizes of 8 bits and 16 bits can also be performed, and the SP is renewed (incremented) by +1 and +2, respectively. FIG. 18 is a schematic diagram of the format thereof. As to the one wherein the stack pop mode is invalid for the operand, a reserve instruction exception is generated. Specifically, the stack pop mode designating for a write operand and a read-modify-write operand becomes the reserve instruction exception.

Figure 19:
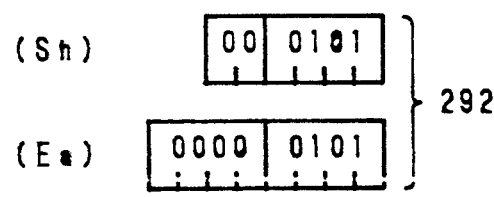

The stack push mode takes as an operand the content of the memory whose address is the content of the SP decremented by the operand size. In the stack push mode, the SP is decremented before operand access. For example, when handling 32-bit data, the SP is renewed (decremented) by −4 before operand access. It is also possible to designate the stack push mode for operands of sizes of 8 bits and 16 bits, and the SP is renewed (decremented) by −1 and −2, respectively. FIG. 19 is a schematic diagram showing the format thereof. As to the one wherein the stack push mode is invalid for the operand, a reserve instruction exception is generated. Specifically, the stack push mode designating a read operand and a read-modify-write operand becomes the reserve instruction exceptions.

(2.4.2) "Chained Addressing Mode"

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized. The chained addressing mode of the processor instruction of the microprocessor of the present invention is an addressing mode based on such a conception. A complicated addressing mode is particularly useful for data reference between modules or the processing system of AI (Artificial Intelligence) language.

When designating the chained addressing mode, in the basic addressing mode designated field, one is designated from among three kinds of designating methods viz. a register based chained addressing mode, a PC based chained addressing mode and an absolute chained addressing mode.

Figure 20:
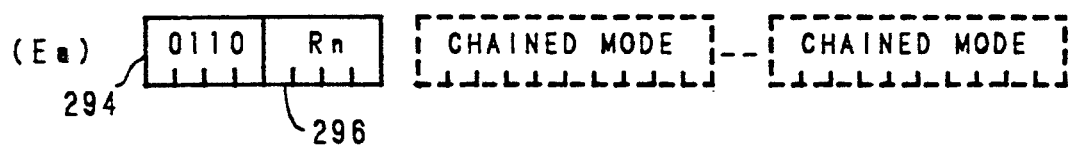

The register based chained addressing mode is an addressing mode taking the value of register as the base value of the chained addressing to be extended. FIG. 20 is a schematic diagram showing the format 294 thereof. Symbol Rn 296 shows the number of the general-purpose register.

Figure 21:

The PC based chained addressing mode is an addressing mode taking the value of the program counter (PC) as the base value of the chained addressing to be extended. FIG. 21 is a schematic diagram showing the format 298 thereof.

Figure 22:
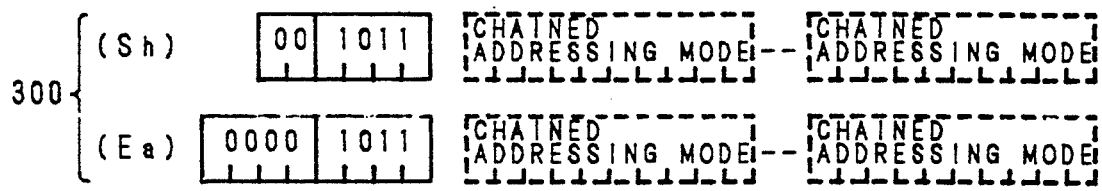

The absolute chained addressing mode is an addressing mode taking zero as the base value of the chained addressing to be extended. FIG. 22 is a schematic diagram of the format 300 thereof.

Figure 23:
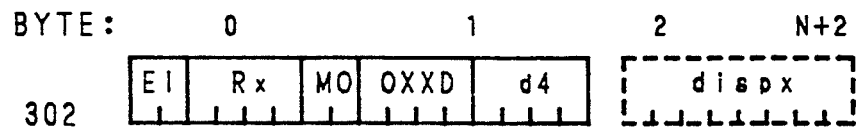

The chained addressing mode designating field to be extended takes 16 bits as a unit, and this is repeated number of times. In each stage of the chained addressing mode, addition of displacement, scaling (×1, ×2, ×4, ×8) and addition of an index register, and indirect reference of memory are performed. FIG. 23 is a schematic diagram showing the format 302 of the chained addressing mode. Each field has meanings as shown below.

| | |
|---|---|
| E=0: | Chained addressing mode is continued. |
| E=1: | Address calculation ends. |
| | tmp ==> address of operand |
| I=0: | No memory indirect reference is performed. |
| | tmp + disp + Rx * Scale ==> tmp |
| I=1: | Memory indirect reference is performed. |
| | mem [tmp + disp + Rx * Scale] ==> tmp |
| M=0: | \<Rx\> is used as an index. |
| M=1: | Special index |
| | \<Rx\> = 0 Index value is not added (Rx = 0). |
| | \<Bx\> = 1 Program counter is used as an index value (Rx = PC). |
| | \<Rx\> = 2 or more Reserved. |
| D=0: | The value of field d4 of four bits in the chained addressing mode is quadrupled to be taken as a displacement value, and this value is added. The d4 is handled with a signed binary number, and us used by surely quadrupling it irrespective of the size of the operand. |
| D=1: | The dispx (16/32 bits) designated in the extension part of the chained addressing mode is taken as a displacement value, the size of the extension part whereto this value is added is designated in the d4 field. |
| | d4 = 0001    dispx: 16 bits |
| | d4 = 0010    dispx: 32 bits |
| XX: | Index scale (scale = 1/2/4/8) |

Where scaling of ×2, ×4, ×8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 24:
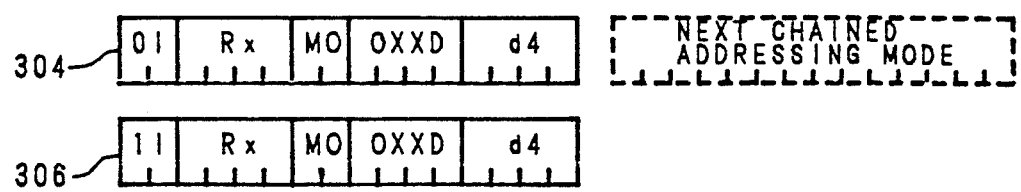
Figure 25:
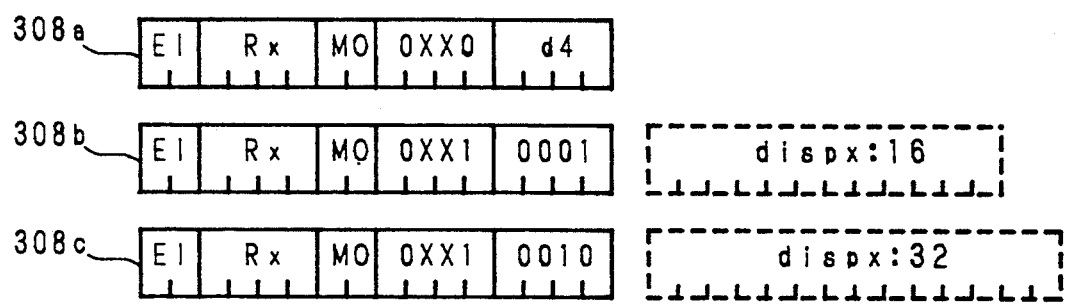

FIGS. 24 and 25 show variations on the instruction format formed by the chained addressing mode.

FIG. 24 shows variations of continuation 304 and completion of the chained addressing mode.

FIG. 25 shows variations 308a, 308b, 308c on the size of displacement.

In the case where the chained addressing mode of an arbitrary number of stages can be utilized, case-sorting in the compiler, based on the number of stage, can be dispensed with, and therefore an advantage of alleviating the burden on the compiler is obtainable. This is because, even if frequency of chained reference is very low, the compiler has to be able to generate a correct code without fail. For this reason, up to an arbitrary number of stages can be applied in the format.

(3) "Format of Test Instruction of Microprocessor of the Present Invention"

The test instruction of the microprocessor of the present invention has a format which is of fixed 35-bit length. FIG. 26 through FIG. 31 are schematic diagrams showing formats of the test instructions used for the microprocessor of the present invention. Meanings of the symbols appearing in the formats are described below.

IRL: Designates a field to be inputted from pins 0 through 2 of an interruption request line.

D: Designates a field to be inputted from pins 00 through 31 of a data bus.

MM: Designates a portion specifying whether the calculation result is outputted to an external memory, or not.

TPAR: Designates a portion at which parameter related to a calculation is specified.

SREG: Designates a portion at which the position of a register of a source operand is specified.

DREG: Designates a portion at which the position of a destination operand register is specified.

ZS: Designates a portion at which a size of a source operand is specified.

ZD: Designates a portion at which size of a destination operand is specified.

DD: Designates a portion at which a scan-in data is specified.

In addition, there are fields for specifying the 12-bit micro ROM address and ignoring the specified data ("don't care").

When the test instruction is activated, only the value in a register file or an immediate data is used for the source operand. As a result, the test instruction has no address-specifying field related to memory operand such as addressing mode for example.

(3.1) "Continuous Execution Instruction"

FIG. 26 and FIG. 27 are format diagrams showing the test instructions of continuous execution instruction, respectively.

The continuous execution instruction activates operation of the microprocessor of the present invention according to the microprogram from the specified micro ROM address.

When operating the microprocessor of the present invention according to the microprogram from the specified micro ROM address, the first continuous execution instruction shown in FIG. 26 uses codes MM, TPAR, SREG, DREG, ZS and ZD as parameters for the microprogram.

The second continuous execution instruction shown in FIG. 27 does not specify the parameter for the microprogram.

An arbitrary value of the micro ROM addresses specified by those two continuous execution instructions are usable in a range within the micro ROM address of the microprocessor of the present invention. As a result, by these two continuous execution instructions, execution of the microprogram from any micro ROM address can be specified for the microprocessor of the present invention.

(3.2) "Step Execution Instruction"

FIG. 28 and FIG. 29 are format diagrams showing the test instructions of step-execution instruction.

The step-execution instruction activates operation of the microprocessor of the present invention by one microstep in response to the microinstruction at the specified micro ROM address.

When the first step-execution instruction shown in FIG. 28 activates operation of the microprocessor of the present invention by one micro-step from the specified micro ROM address as per the microprogram, the first step-execution instruction uses codes MM, TPAR, SREG, DREG, ZS and ZD as parameters for the microprogram.

The second step-execution instruction shown in FIG. 29 does not specify parameters for the microprogram.

An arbitrary value of the micro ROM addresses specified by these two step-execution instructions are usable in a range within the micro ROM address of the microprocessor of the present invention. Accordingly, these two step-execution instructions can instruct the microprocessor to execute one step of microinstruction at an optional micro ROM address and then stop the operation as of the intact state.

(3.3) "Load Instruction"

The format of the test instruction shown in FIG. 30 represents the format of a load instruction for loading an operand from exterior of the microprocessor of the present invention while the test mode is underway.

In the load instruction, 32 of 35 bits are used for the field of the immediate operand, and thus, a 32-bit value can be fetched into the microprocessor of the present invention.

(3.4) "Scan Path Instruction"

A format shown in FIG. 31 is the format of a scan path instruction which activates the scan path of the microprocessor of the present invention while the test mode goes on. By the scan-path instruction, the microprocessor of the present invention can serially input and output data to and from the internal scan path.

(4) "Configuration of Function Block"

Figure 32:
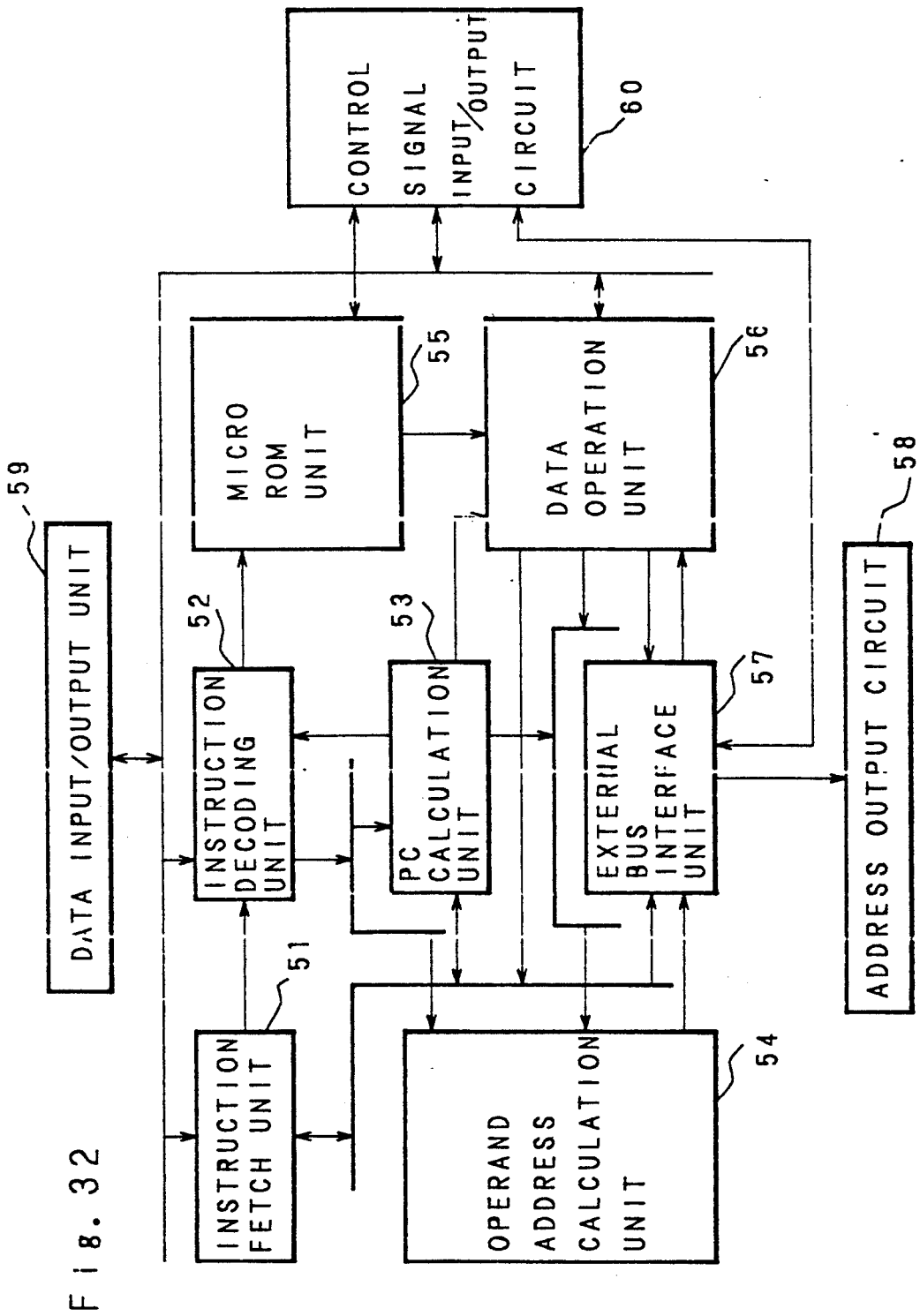
FIG. 32 is a block diagram showing an example of the microprocessor of the present invention.

FIG. 32 is a block diagram showing a configuration of the microprocessor of the present invention.

The interior of the microprocessor of the present invention is functionally divided roughly into an instruction fetch unit 51, an instruction decoding unit 52, a PC calculation unit 53, an operand address calculation unit 54, a micro ROM unit 55, a data operation unit 56 and an external bus interface unit 57.

In FIG. 32, in addition to the above-described units, an address output circuit 58 for outputting an address to the exterior of a CPU, a data input/output circuit 59 for inputting and outputting data from and to the exterior of the CPU, and a control signal input/output circuit 60 are shown being separated from the other function block units.

(4.1) "Instruction Fetch Unit"

The instruction fetch unit 51 which comprises a branch buffer, an instruction queue and a controlling unit thereof, determines the address of an instruction to be fetched next and fetches the instruction from the branch buffer or a memory outside the CPU. It also performs instruction registering to the branch buffer.

The branch buffer is small-scaled, therefore operating as a selective cache.

Detailed description on the operation of the branch buffer is disclosed in the Japanese Patent Application Laid-Open No. 63-567311(1988) (incorporated herein by reference).

The address of an instruction to be fetched next is calculated by a dedicated counter as the address of the instruction to be inputted to an instruction queue. In the case where a branch or jump is generated, an address of a new instruction is transferred from the PC calculation unit 53 or the data operation unit 56.

In the case where an instruction is fetched from a memory outside the CPU, the address of the instruction to be fetched is outputted from the address output circuit 58 to the outside of the CPU through the external bus interface unit 57, and an instruction code is fetched from the data input/output circuit 59. Then, among the instruction codes in buffering, the instruction code to be decoded next is outputted to the instruction decoding unit 52.

In addition, test instructions are not fetched by the instruction fetch unit 51.

(4.2) "Instruction Decoding Unit"

In the instruction decoding unit 52, basically an instruction code is decoded on a 16-bit (half word) basis. This block comprises a FHW decoder for decoding an operation code included in the first half word, a NFHW (not first half word) decoder for decoding an operation code including in the second and the third half words, and an addressing mode decoder for decoding an addressing mode. These FHW decoder, NFHW decoder and addressing mode decoder are generally called the first stage decoder.

There are also the second stage decoder which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 52 decodes the instruction code being inputted from the instruction fetch unit 51 by 0 bytes through 6 bytes per two clock. Among the results of decoding, information on operation in the data operation unit 56 is outputted to the micro ROM unit 55, information on operand address calculation is outputted to the operand address calculation unit 54, and information on PC calculation is outputted to the PC calculation unit 53, respectively.

The test instructions are not inputted to the instruction decoding unit 52, accordingly they are not decoded.

(4.3) "Micro ROM Unit"

The micro ROM unit 55 comprises a micro ROM for storing various microprograms which mainly controls the data operation unit 56 and diagnoses each function block of the microprocessor of the present invention, a micro sequencer, and a micro instruction decoder. A micro instruction is read out from the micro ROM every other clock cycle. The micro sequencer accepts processings of exception, interruption and trap (these three are generally called EIT) in a hardware manner in addition to the sequential processings shown by the microprograms. The micro ROM unit 55 also controls a store buffer.

To the micro ROM unit 55, under the processor mode, there are inputted flag information generated by interruption independent of the instruction code or by the result of operation execution, and output of an instruction decoding unit such as output of a second decoder.

Under the test mode, the micro ROM unit 55 operates as a diagnosing processor for the CPU. Under the test mode, not output of the second decoder but output of the data input/output circuit 59 is directly inputted to the micro ROM unit 55. In addition, no interrupts are accepted under the test mode.

Under the processor mode, output of the micro decoder is mainly given to the data operation unit 56, but some information such as information of stopping other preceding processing due to execution of a jump instruction is outputted also to other blocks.

Under the test mode, the micro ROM unit 55 outputs various information for diagnosing to other blocks inside of the microprocessor of the present invention as well as abovementioned output under the processor mode.

(4.4) "Operand Address Calculation Unit"

The operand address calculation unit 54 is controlled in a hardwired manner by information on operand address calculation outputted from the address decoder of the instruction decoding unit 52 or the like. In this operand address calculation unit 54, substantially all processing on operand address calculations is performed. Checking is conducted to determine whether or not the address of memory access for memory indirect addressing and the operand address can be within an I/O area mapped in the memory.

The result of address calculation is sent to the external bus interface unit 57. The values of the general-purpose register and the program counter required for address calculation are inputted from the data operation unit 56.

In performing the memory indirect addressing, the memory address to be referred is outputted from the address output circuit 58 to the outside of the CPU through the external bus interface unit 57, and the indirect address value inputted from the data input/output unit 59 is fetched through the instruction decoding unit 52.

(4.5) "PC Calculation Unit"

The PC calculation unit 53 is controlled in a hardwired manner using information on PC calculation outputted from the instruction decoding unit 52. The PC calculation unit 53 calculates the PC value of an instruction. The processor instructions of the microprocessor of the present invention are a variable-length instruction set, and the length of an instruction can be found only after the instruction is decoded. For this reason, the PC calculation unit 53 generates the PC value of the next instruction by adding the length of the instruction outputted from the instruction decoding unit 52 to the PC value of the instruction in decoding.

The result of calculation in the PC calculation unit 53 is outputted as the PC value of each instruction together with the result of decoding of the instruction.

(4.6) "Data Operation Unit"

The data operation unit 56 is controlled by microprograms, and executes the operation required for realizing the function of each instruction by means of a register file and an arithmetic unit according to microinstructions output by the micro ROM unit 55.

In the case where the operand to be operated by an instruction is an address or an immediate, the address or the immediate calculated in the operand address calculation unit 54 is obtained by passing it through the external bus interface unit 57 to the data operation unit 56. In the case where the operand to be operated on is in a memory outside the CPU, the external bus interface unit 57 outputs the address calculated in the address calculation unit 54 to the address output circuit 58, and the operand fetched from the memory outside the CPU is obtained through the data input/output circuit 59.

In the case where the load instruction is executed under the test mode, an immediate operand to be an operation object is inputted to the data operation unit 56 through the data input/output circuit 59.

Arithmetic units include an ALU, a barrel shifter, a priority encoder, a counter, and a shift register. The register file and the main arithmetic units are connected through three buses, and one micro instruction for directing operation between registers is processed in two clocks.

In the case where an access to the memory outside the CPU is required at the data operation unit, the address is outputted from the address output circuit 58 to the outside of the CPU through the external bus interface unit 57 under the control of the microprogram, and the target data is fetched through the data input/output circuit 59.

In the case where data is stored in the memory outside the CPU, the address is outputted from the address output circuit 58 through the external bus interface unit 57, and simultaneously the data is outputted from the data input/output circuit 59 to the outside of the CPU. In order to efficiently perform an operand store, a four-byte store buffer is installed in the data operation unit 56.

In the case where the data operation unit 56 obtains a new instruction address by processing a jump instruction or an exceptional processing, this is outputted to the instruction fetch unit 51 and the PC calculation unit 53.

(4.7) "External Bus Interface Unit"

The external bus interface unit 57, under the processor mode, controls communication through the input-/output pins of the microprocessor of the present invention. All memory accesses are performed in a clock-synchronized manner, and can be performed in a minimum of two clock cycles.

Access requests to memory are generated independently from the instruction fetch unit 51, the operand address calculation unit 54 and the data operation unit 56. The external bus interface unit 57 arbitrates these memory access requests. Furthermore, access to data located at misaligned words, i.e., memory address which involve crossing over the word boundary of 32 bits (one word) which is the size of the data bus connecting the memory to the CPU is performed in a manner that crossing over the word boundary is automatically detected in this block and the access is decomposed into memory accesses over two steps.

This unit also performs conflict preventing processing and by-pass processing from the store operand to the fetch operand in the case where the operand to be pre-fetched and the operand to be stored are superposed.

Under the test mode, the external bus interface unit 57 does not accept any memory access requests. Under the test mode, the data input/output circuit 59 and the address output circuit 58 are directly controlled by the micro ROM unit 55.

(5) "Input/output Interface of Microprocessor of the Present Invention"

Figure 33:
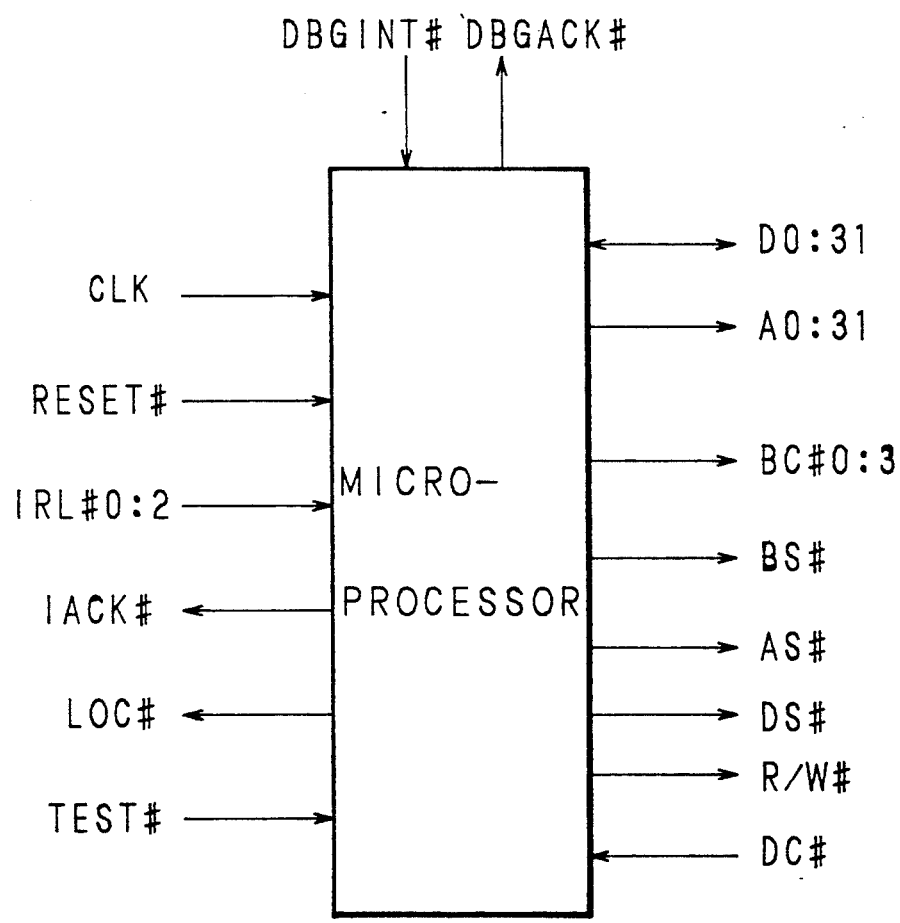
FIG. 33 is a schematic diagram showing the external pins of the microprocessor of the present invention.

FIG. 33 is a schematic diagram to illustrate input-/output pins of the microprocessor 100 of the present invention.

In FIG. 33, CLK designates a clock input, RESET# designates a reset interruption input, IRL#0:2 designates three interruption inputs, IACK# designates an interruption acknowledge output, LOC# designates an output signal indicating an interlock bus cycle, TEST# designates a test interruption input, DBGINT# designates a debug interruption input, DBGACK# designates an output signal indicating that a debugging process is underway, BC#0:3, BS#, AS#, DS# and R/W# designate bus-cycle control outputs, DC# designates a bus-cycle control input, D0:31 designates 32 data input-/output lines, and A0:31 designates 32 address output lines.

Except for the TEST# pin, all the above pins are used for building the microprocessor 100 in any applied apparatus. To prevent the test interruption signal from erroneously being inputted while the process for building the microprocessor 100 in an applied apparatus is still underway, the TEST# pin is connected to the power-supply source.

While the processor mode goes on, each of the input and output signals are used for performing those functions described above. On the other hand, when the test mode is entered, the DBGINT# pin is used as an input signal is asserted when the test instruction is inputted. The DBGACK# pin is used as an output signal which indicates that the test instruction is under execution. The IRL#0:2 pin is used to execute the function of the input of test instruction. The D0:31 pin is used to execute the function of the input of test instruction and the output of test results. The A0:31 pin is used to execute the function of the output of test result. For the scan instruction, the D0 pin has the function of the scan input, whereas the LOC# pin has the function of the scan-out output.

Each of these input/output pins allows signals to be inputted and outputted by way of synchronous clock with the CLK pin.

(6) "Operation under the Processor Mode"

While the processor mode is underway, the microprocessor 100 of the present invention efficiently operates itself by executing the processor instructions with the pipeline processing. Now, the description refers to the sequence of the pipeline processing executed by the microprocessor 100 of the present invention, and then refers to an example of operation for accessing the external memory of the microprocessor under the processing mode.

(6.1) "Pipeline Processing Mechanism"

Figure 34:
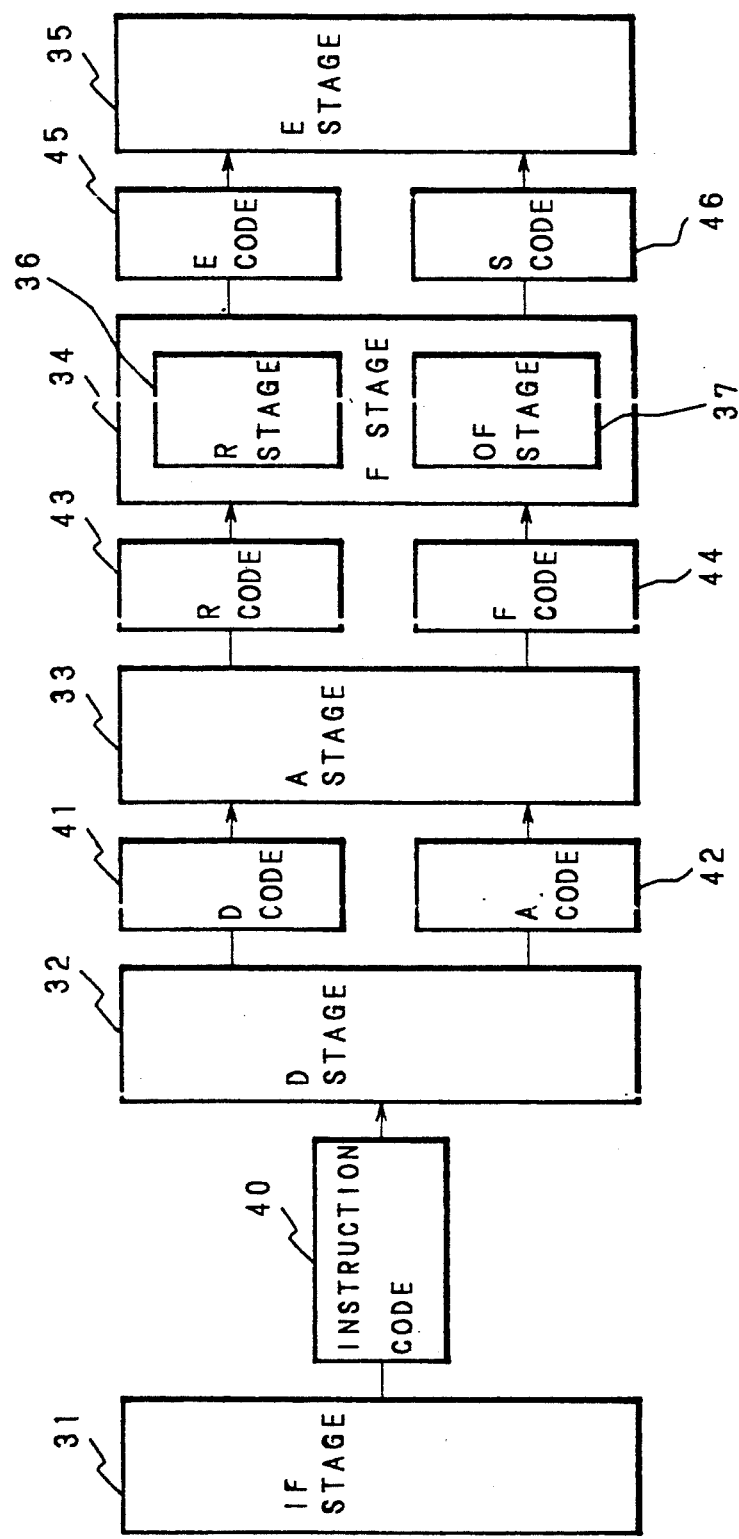
FIG. 34 is a schematic diagram showing an outline of the pipeline processing of the microprocessor of the present invention.

FIG. 34 is a schematic diagram showing a pipeline processing mechanism of the microprocessor 100 of the present invention.

The basis of pipeline processing has a five-stage configuration which comprises an instruction fetch stage (IF stage) 31 for prefetching an instruction, a decoding stage (D stage) 32 for decoding the instruction, an operand address calculation stage (A stage) 33 for performing address calculation of an operand, an operand fetch stage (F stage) 34 consisting of a portion for performing micro ROM access (particularly called an R stage 36) and a portion for prefetch an operand (particularly called an OF stage 37), and an execution stage (E stage) 35 for executing an instruction.

The E stage 35 comprises a one-stage store buffer, and besides, in some high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clocks cycle.

Accordingly, ideally, the pipeline processing progresses one after another on a two clocks basis.

The microprocessor 100 of the present invention comprises some instructions which cannot be processed only by the basic pipeline processing of one time such as an operation between memory and memory or a memory indirect addressing, but the microprocessor 100 of the present invention is designed in such a manner that a balanced pipeline processing can be performed whenever possible for processing of these instructions. For the instruction having a plurality of memory operands, pipeline processing is performed based on the number of memory operands by decomposing it into a plurality of pipeline processing units (step code) at the decoding stage.

A detailed description of the decomposing method of the pipeline processing unit is disclosed in Japanese Patent Application Laid-Open No. 63-89932 (1988) (incorporated herein by reference).

Information transferred from the IF stage 31 to the D stage 32 is an instruction code itself. Information transferred from the D stage 32 to the A stage 33 includes two kinds of information, one on operation designated by an instruction (called a D code 41) and the other on address calculation of an operand (called an A code 42). Information transferred from the A stage 33 to the F stage 34 includes an R code 43 comprising an entry address of a microprogram and a parameter of the microprogram and an F code 44 comprising an operand address and information from memory access. Information transferred from the F stage 34 to the E stage 35 is an E code 45 comprising operation control information and literal and an S code 46 comprising an operand and its operand address.

EIT detected in the stage other than the E stage 35 does not start the EIT processing until the code thereof reaches the E stage 35. This is because only the instruction processed in the E stage 35 is an instruction at the step of executing, and the instructions having been processed between the IF stage 31 and the F stage 34 do not reach the step of executing yet. Accordingly, for the EIT detected in the stage other than the E stage 35, the detection thereof is recorded in the step code, and it is only transmitted to the following stage.

(6.2) "Processing of Each Pipeline Stage"

As shown in FIG. 34, for the sake of convenience, names are given to the input and output step codes of each pipeline stage. The step codes perform processing relating to the operation codes, and include two series; a series becoming entry addresses of microprograms and parameters for the E stage 35 and a series becoming operands for microinstructions of the E stage 35.

(6.2.1) "Instruction Fetch Stage"

The instruction fetch stage (IF stage) 31 fetches a processor instruction from the memory or the branch buffer, inputs it to the instruction queue, and outputs an instruction code to the D stage 32. Input of the instruction queue is performed in an aligned four-byte unit. In the case where a processor instruction is fetched from the memory, a minimum of two clock cycles are required for the aligned four bytes. In the case where the branch buffer hits, fetching can be made in one clock per aligned four bytes. The output unit of the instruction queue is variable on a two-byte basis, and a maximum of six bytes can be outputted during two clocks. Immediately after a branch, two bytes of the instruction base part can also be transferred directly to the instruction decoder by by-passing the instruction queue.

Control of registering and clearing of the instruction to the branch buffer, management of addresses of the instructions to be prefetched and control of the instruction queue are also performed in the IF stage 31.

(6.2.2) "Instruction Decoding Stage"

The instruction decoding stage (D stage) 32 decodes a processor instruction code inputted from the IF stage 31. Decoding is performed on a two clock cycle basis using the first stage decoder consisting of the FHW decoder, the NFHW decoder and the addressing mode decoder in the instruction decoding unit 52. An instruction code of 0 to 6 bytes is consumed in the decoding processing during one operation thereof (no instruction code is consumed in the outputting processing of the step code comprising the return address of the RET instruction). By one operation of the decoding unit, the control code of about 35 bits which is the A code 42 as address calculation information, address modification information of maximum of 32 bits, the control code of about 50 bits which is the D code 41 as the result of intermediate decoding of the operation code, and 8 bits literal information are inputted to the A stage 33.

In the D stage 32, control of the PC calculation unit 53 of each instruction, and outputting processing of the instruction code from the instruction queue are also performed.

(6.2.3) "Operand Address Calculation Stage"

Processing functions of the operand address calculation stage (A stage) 33 are roughly divided into two parts. One is processing for post-decoding of the operation code using the second stage decoder of the instruction decoding unit 52 and the other is for calculation of an operand address in the operand address calculation unit 54.

The post-decoding processing of the operation code inputs the D code 41 and outputs the R code 43 comprising write reserve of register and memory, an entry address of a microprogram and parameters for the microprogram.

In addition, the write reserve of the register or memory is for preventing a wrong address calculation by re-writing the content of the register or memory referred in the address calculation of an instruction with the instruction preceding on the pipeline.

The operand address calculation processing inputs the A code 42, performs addition in the operand address calculation unit 54 according to the A code 42 or performs address calculation by combining memory indirect reference, and outputs the result of the calculation as the F cord 44. At this time, a conflict check is done in reading-out of the register and the memory attending on the address calculation. If a conflict is indicated because the preceding instruction has not completed the writing processing to the register or the memory, the processing waits until the preceding instruction completes the write processing in the E stage 35.

(6.2.4) "Micro ROM Access Stage"

Processing of the operand fetch stage (F stage) 34 is also divided roughly into two parts. One is access processing of the micro ROM, particularly called the R stage 36. The other is operand prefetch processing, particularly called the OF stage 37. The R stage 36 and the OF stage 37, which do not necessarily operate at the same time, operate independently depending on whether or not the memory access right can be acquired.

The micro ROM access processing which is the processing of the R stage 36 is the micro ROM access and micro instruction decoding processing for generating the E code 45 which is an execute control code used for execution in the following E stage 35 for the R code 43. In the case where processing for one R code 43 is decomposed into two or more microprogram steps, the micro ROM is used in the E stage 35, and the following R code 43 waits for micro ROM access. Micro ROM access using the R code 43 is performed when the last micro instruction is executed in the preceding E stage 35. In the microprocessor 100 of the present invention, almost all of the basic instructions are executed in one microprogram step, therefore, there are many actual cases in which the micro ROM accesses to the R code 43 are performed one after another.

(6.2.5) "Operand Fetch Stage"

The operand fetch stage (OF stage) 37 performs operand prefetch processing among the above-mentioned two processings performed in the F stage 34.

Operand prefetch processing inputs the F code 44 and outputs the fetched operand and the address thereof as the S code 46. One F code 44 may cross over the word boundary, but designates operand fetching of four bytes or less. The F code 44 also comprises designating of whether or not access to the operand is to be performed. In the case where the operand address itself or the immediate calculated in the A stage 33 is transferred to the E stage 35, no operand prefetch is performed, and the content of the F code 44 is transferred as the S code 46. In the case where the operand intended to be prefetched coincides with the operand intended to be write-processed in the E stage 35, no operand prefetching is performed from the memory, but operation of the prefetch is performed by by-passing it.

(6.2.6) "Execution Stage"

The execution stage (E stage) 35 operates with the E code 45 and the S code 46 taken as inputs. This E stage 35 is a stage for executing instructions, and all processings performed in the stages before and in the F stage 34 are pre-processings for the E stage 35. In the case where a jump instruction is executed in the E stage 35 or the EIT processing is started, all the processings from the IF stage 31 to the F stage 34 are disabled. The E stage 35 is controlled by microprograms, and the instruction is executed by executing a series of microprograms starting with the entry address of microprogram indicated in the R code 43.

Read of the micro ROM and execution of the microinstruction are performed in a pipeline manner. Accordingly, in the case where a branch takes place in the microprogram, a gap (blank) of one microstep is generated. The E stage 35 can also perform pipeline processing of an operand store of four bytes or less and the following microinstruction execution by utilizing the store buffer in the data operation unit 56.

In the E stage 35, the write reserve to the register and the memory performed in the A stage 33 is released after write of the operand.

Various interruption are accepted directly to the E stage 35 at a timing of a pause of the instruction, and necessary processing is executed by microprograms. Processings of other various EITs are performed by microprograms.

(6.3) "Status Control of Each Pipeline Stage"

Each stage of the pipeline has an input latch and an output latch, and is based on operation independent of other stages. Each stage starts the next processing after such whole processes as the one-preceding processing has been completed, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

In other words, it is required that all input signals are prepared at a timing with one clock before the operation start in each stage. If the input signals are not all prepared, that stage is put in the waiting state (input waiting). For transferring from the output latch to the input latch of the next stage is done, it is required that the input latch of the next stage is in the empty state, and when the input latch of the next stage is not empty, the pipeline stage is also put in the waiting state (output waiting). If the required memory access right cannot be acquired, or wait is inserted into the memory access under processing, or another pipeline conflict occurs, the processing itself of each stage is delayed.

(6.4) "Memory Access Operation under Processor Mode"

Figure 35:
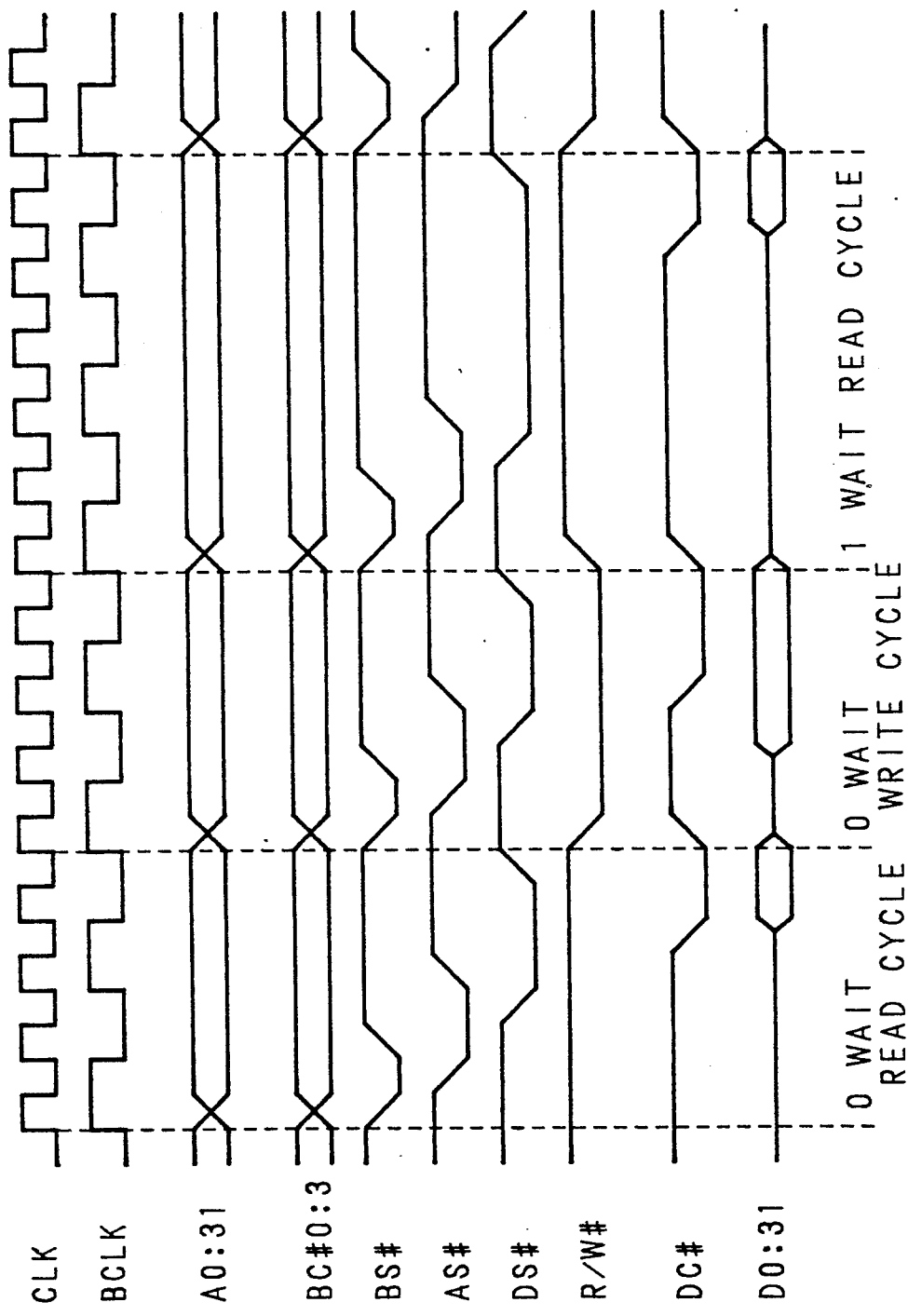
FIG. 35 is a timing chart showing a basic memory cycle of the microprocessor of the present invention.

FIG. 35 is a timing chart which illustrates the memory access timing showing an example of the external input/output operation of the microprocessor 100 of the present invention while the processor mode is underway.

The microprocessor 100 accesses high-speed memory at a rate of every four clocks of externally input clocks. In FIG. 35, initially, the zero-weight read cycle, followed by the zero-weight write cycle, and finally designates the one-clock-weight read cycle are shown. A character BCLK designates the bus clock having a cycle that doubles the cycle of the CLK, where the BCLK signal becomes the basis of memory bus cycle. The BCLK determines the odd-number and even-number pulses of the CLK. Synchronization between the microprocessor which operates itself synchronous with the CLK and the BCLK is implemented by the reset interruption.

Address is output in the read cycle. When the CLK falls during the BCLK is at low level, the value of D0:31 is fetched when the DC# is asserted before the bus cycle eventually ends. In the write cycle, first, address is outputted, and then data is outputted one CLK clock later on. When the DC# is asserted at the falling of the CLK during the BCLK is at low level, the bus cycle completes.

In the manner mentioned above, while the processor mode is underway, data input/output operation to and from external is executed by causing the microprocessor to activate the bus cycle synchronous with the CLK.

(7) "Operation under the Test Mode"

Under the test mode, the microprocessor of the present invention executes diagnosis of respective function blocks according to the test instruction.

Figure 36:
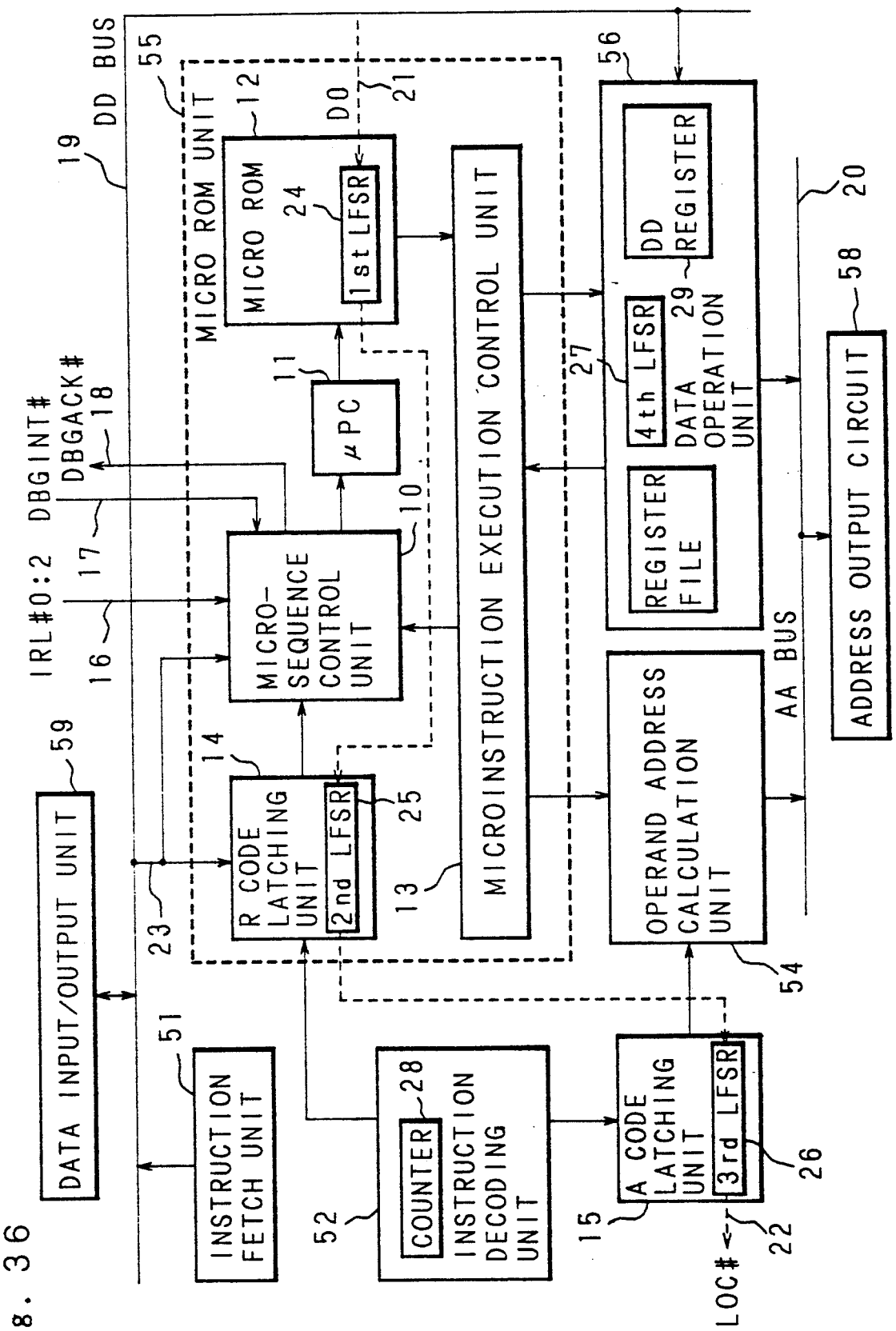
FIG. 36 is a block diagram showing a concept of the operating conditions under a test mode of the microprocessor of the present invention.

FIG. 36 illustrates the detailed block diagram of the microprocessor 100 of the present invention by designating the conceptual operating condition of the microprocessor 100 while the test mode is underway.

The microprocessor 100 embodied by the present invention is characteristically composed of the following; a microsequence control unit 10 which fetches the micro ROM address field of the test instruction or the micro ROM address of R code 43 and then controls the sequence of the microprogram from either of these addresses; a microprogram counter ($\mu$pc) 11 which manages the address of the microprogram; a micro ROM 12 which stores the microprogram; a microinstruction execution control unit 13 which controls decoding and execution of respective microinstructions; an R code latching unit 14 which transfers R code 43 being part of the test instruction or the output code from the instruction decoding unit 52 to the microsequence control unit 10; an A code latching unit 15 which accumulates the A code 42 by way of latching and compressing it; the instruction fetch unit 51; the instruction decoding unit 52; the operand address calculation unit 54; the data operation unit 56; the IRL#0:2 pin 16 which inputs the higher 3 bits of the test instruction to the microsequence control unit 10; the DBGINT# pin 17 which indicates that the test instruction is inputted; the DBGACK# pin 18 which indicates that the test instruction is under execution at the test mode; the DD bus 19 which transfers the lower 32 bits of the test instruction from the data input/output circuit 59 to the R code latching unit 14 and to the microsequence control unit 10 via a bypass bus 23 and also transfers the test results of the instruction fetch unit 51 to the data input/output circuit 59; the AA bus 20 which transfers the test results of the operand calculation unit 54 or the data operation unit 56 to address output circuit 58; the DO pin 21 which transfers 1-bit scan-in data from the data input/output circuit 59 to the first linear feedback shift register LFSR 24 of the output part of the micro ROM 12; and the LOC# pin 22 which outputs scan-out data from a third linear feedback shift register LFSR 26 of the A code latching unit 15 to exterior of the microprocessor 100.

The R code latching unit 14 incorporates a second linear feedback shift register LFSR 25. The data operation unit 56 incorporates a fourth linear feedback shift register LFSR 27. The instruction decoding unit 52 incorporates a counter 28 which is used for implementing the self-diagnosis of the microprocessor 100 of the present invention.

Under the test mode, in response to the inputted test instruction, the microsequence control unit 10 executes a microprogram by accessing the micro ROM 12 so that each of the blocks of the microprocessor is tested. The data needed for executing the test operation are fetched into the DD register 29 of the data operation unit 56 by the data load instruction.

The instruction fetch unit 51 executes test operations under the control of the microinstruction execution control unit 13. The test result is outputted to exterior of the microprocessor via the DD bus 19 and the data input/output circuit 59.

The instruction decoding unit 52 executes test operations according to the direction from the microinstruction execution control circuit 13. The test result is outputted to the R code latching unit 14 and the A code latching unit 15.

Using data transferred from the register file of the data operation unit 56, the operand address calculation unit 54 executes test operations in response to the microinstruction execution control unit 13. The test result is output to exterior of the microprocessor 100 via the AA bus 20 and the address output circuit 58.

The data operations unit 56 executes test operation under the control of the microinstruction execution control unit 13. The data needed for the test is fetched into the DD register 29 from exterior of the microprocessor by the data load instruction. Intermediate result of calculation by the test operation is stored in a register file. The test result is outputted to exterior of the microprocessor 100 via the AA-bus 20 and the address output circuit 58.

(7.1) "Fetching of Test Instruction"

The test instruction is directly fetched into the R code latching unit 14 and the microsequence control unit 10 via the bypass bus 23 without passing through the instruction fetch unit 51 and the instruction decoding unit 52. The fields of respective test instructions other than the data load instruction and the scan path instruction are of such a format similar to the R code 43 generated by decoding of the processor instruction under the processor mode, and thus, fetching of the test instruction is based on the style of directly rewriting the R code 43. The field of the R code 43 not being specified by the test instruction retains the content held by the R code latching unit 14 before fetching the test instruction. The micro ROM address is directly inputted to the microsequence control unit 10 without rewriting the R code 43.

The memory cycle is not activated by fetching the test instruction. The timing of fetching the test instruction is shown in the timing chart of FIG. 40 together with the output timing of the test result.

During the DBGACK# is negated by assertion of the DBGINT# pin 17 in synchronism with the timing of the rise of the BCLK and CLK in the course of inputting the bit pattern of the test instruction to the IRL#0:2 pin 16 and the D0:31 pin 21, the test instruction is fetched.

(7.1.1) "Format of R code and Test Instruction"

FIG. 37 is a schematic diagram showing the format of the R code 43 having a 32-bit length. Meanings of respective fields of the R code 43 are described below.

OP1: Designates a portion at which the first parameter related to an arithmetic operation is specified.

MW: Designates a portion at which whether a calculated result is outputted to the external memory, or not, is specified.

OP2: Designates a portion at which a second parameter related to an operation is specified.

RS: Designates a portion at which a position of a register of a source operand is specified.

RD: Designates a portion at which a portion of a destination operand register is specified.

WS: Designates a portion at which a size of a source operand is specified.

WD: Designates a portion at which a size of a destination operand is specified.

The field specifying the micro ROM address has eight bits and added four bits of zero at being inputted into the microsequence control unit 10. The microprogram of the microprocessor of the present invention is coded by the microinstruction having 112 bits per word, where the microprogram is stored in the 4K-word space. The lower 4-bits of the entry address of each microprogram routine specified by each R code 43 are always zero. Accordingly, there are 256 entries of the microprogram routine that can be specified by the R code 43.

Of those test instruction formats shown in FIG. 26 through FIG. 31, the first continuous execution instruction shown in FIG. 26 and the first step-execution instruction shown in FIG. 28 respectively rewrites the R code 43. When these two instructions are inputted, except for the OP1 field and those fields specifying the micro ROM address of the R code 43 are rewritten. Concretely, MW field is rewritten into the MM field, the OP2 field into the TPAR field, the RS field into the SREG field, the RD field into the DREG field, the WS field into the ZS field, and the WD field into the ZD field, respectively. The OP1 field and the field designating the upper 8 bits of the micro ROM address are retained as of the value before the fetching of the test instruction.

FIG. 38 illustrates examples of the R code 43 of the processor instruction. Each instruction has the meaning shown below.

MOV.W R2, MEM: Transfers 4-byte data from number 2 register to memory.

CMP.B R8, R0: Compares 1-byte data of number 8 register to 1-byte data of number 0 register.

ADD.W MEM,R2: Adds 4-byte data of memory to 4-byte data of number 2 register and stores the added data in number 2 register.

SHA.W #,R0: Arithematically shifts 4-byte data of number 0 register by two bits.

MUL.H R7,R15: Multiplies each 2-byte data of number 7 and 15 register and stores a product in number 15 register.

JMP @(R3): Jumps to address of 4-byte data of number 3 register.

Since the microprocessor 100 embodied by the present invention executes the instructions MOV.W and ADD.W by applying the identical microprogram, each of these instructions has a microprogram routine which is commonly made available, and yet, both instructions use specific micro ROM addresses identical to each other. The register number and the operand size of respective instructions reflect as the parameter of microprogram in various fields of the R code 43.

FIG. 39 illustrates concrete examples of the test instructions. Each instruction has the meaning shown below.

TESTALUOPE: One of the second continuous execution instructions which tests various operation functions of the ALU.

TESTAADD: One of the second continuous execution instructions which tests an operand address calculation unit.

TCMP.B R8,R0: One of the first continuous instructions which executes a microprogram routine identical to that used by CMP.B R8,R0.

S3MUL.H R7,R15: One of the first step-execution instructions which merely executes a microinstruction at a position three addresses ahead of an entry address of a microprogram routine of MUL.H R7,R15.

OUTPUT R3: One of the first continuous execution instructions which outputs 4-byte data of number 3 register to exterior of the microprocessor 100 via the AA bus 20 and the address output circuit 58.

INPUT R5: One of the first continuous execution instructions which transfers 4-byte data of the DD register 29 in the data operation unit 56 to number 5 register.

Since OP1 of the R code 43 cannot be changed by the test instruction, of those test instruction shown above, before executing either the instruction TCMP.W or the instruction S3MUL.H, it is necessary for execution of the processor instruction causing OP1 to become "0000" during the processor mode. However, since the microprocessor 100 of the present invention allows each bit of the lower 32 bits of the test instruction to freely be set, both the microprogram routine exclusively available for diagnosing respective function blocks of the microprocessor 100 under the test mode and the microprogram routine of the processor instruction can be executed by activating the test instruction.

(7.2) "Output of Test Result"

Figure 40:
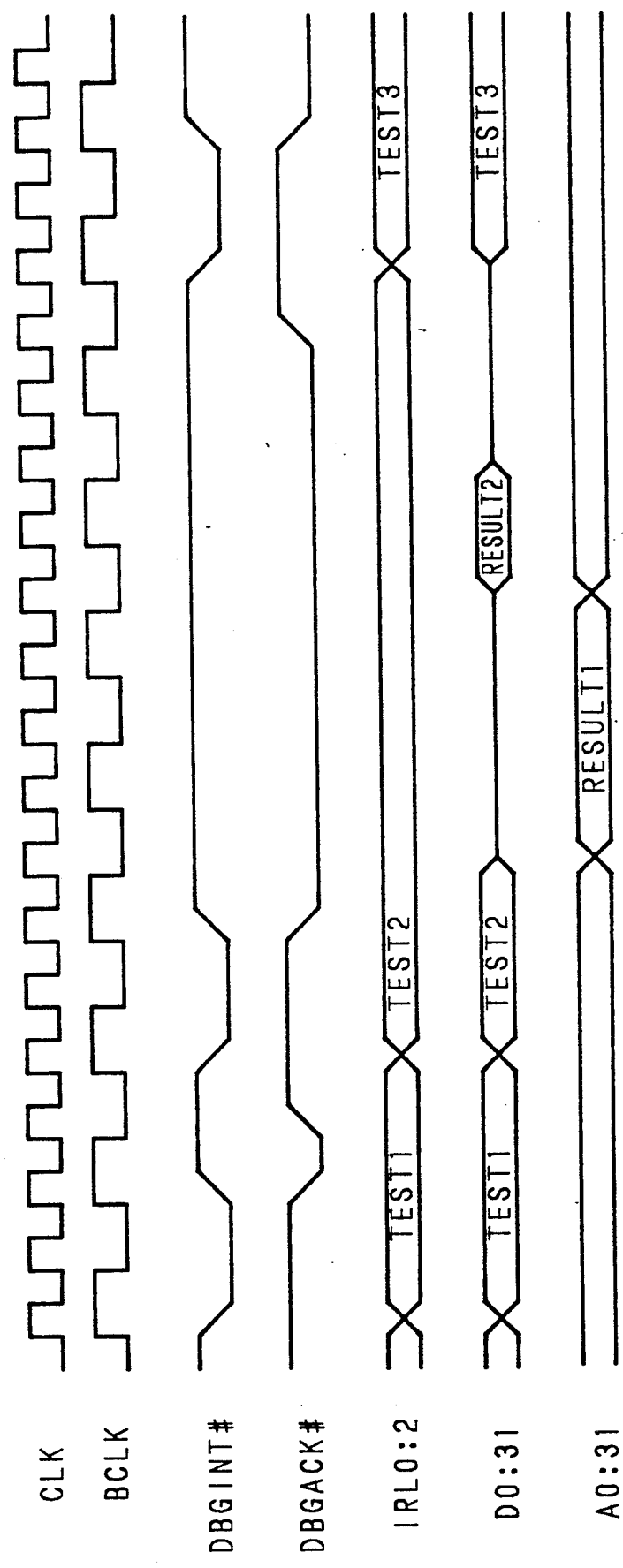
FIG. 40 is a timing chart showing a state of fetching the test instruction and the outputting the test result of the microprocessor of the present invention.

The timing chart shown in FIG. 40 illustrates the timing to output the test result from the microprocessor of the present invention under the test mode together with the timing of fetching the test instruction.

While the test mode is underway, the address output circuit 58 always drives the output pin A0:31 by the content of the AA bus 20, and thus, memory cycle is not activated. When the test result is outputted to the AA bus 20 in response to the test instruction, this value is then outputted to the output pin A0:31. When the instruction fetch unit 51 is tested, the test result is outputted to exterior of the microprocessor via the DD bus 19 and the data input/output circuit 59. Like the case of outputting the test result using the output pin A0:31, in the course of asserting the DBGACK# pin 18, the data input/output circuit 59 drives the input/output pin D0:31 by the content of the DD bus 19. In this case, memory cycle is not activated.

(7.3) "Operation of Step Execution Instruction"

When the microprocessor 100 of the present invention executes the step-execution instruction, only one microinstruction is executed, and then, the microprocessor enters into the state of standing by the execution of the following test instruction. When executing the step-execution instruction, the microprocessor 100 of the present invention causes a portion, which is a part of the microinstruction and which transfers the sequence field controlling executing sequence of the microprogram to the microsequencer, to enter into the state of executing the step-execution instruction by means of hardware.

FIG. 41 is a schematic diagram which illustrates field division of the microinstruction of the microprocessor 100 of the present invention.

As shown in FIG. 41, the microinstruction of the microprocessor is divided into 10 kinds of fields. Each field is decoded by the microinstruction decoder, and then becomes a signal matching the all control lines specific by the microinstruction with each other. There are 6 bits in each field which controls the executing sequence of the microprogram, where the sequence is controlled corresponding to the bit patterns shown in FIG. 42.

Figure 43:
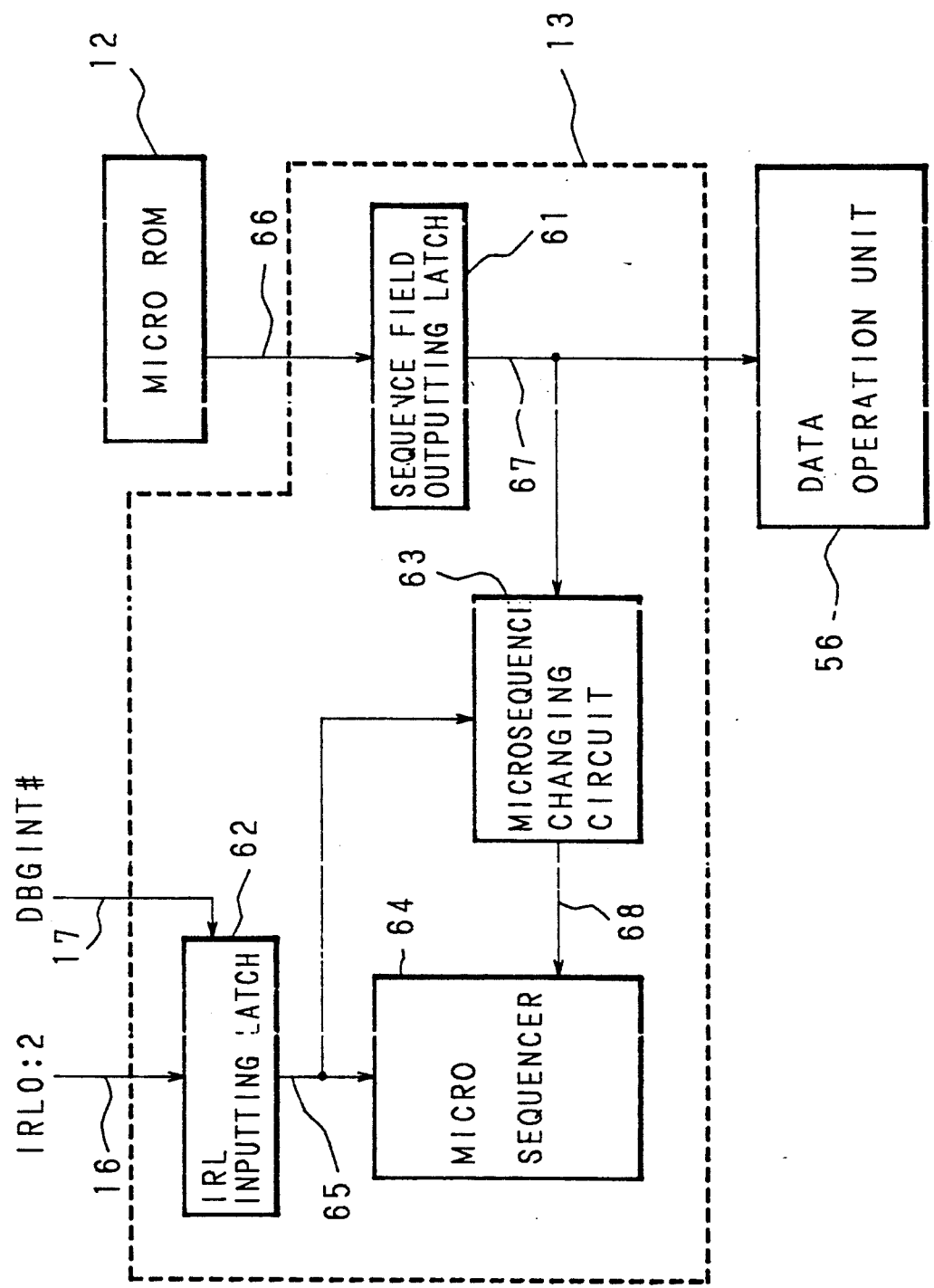
FIG. 43 is a block diagram showing the construction of the control circuit for a step-execution instruction.

FIG. 43 is a schematic circuit diagram which illustrates the simplified construction of the control circuit for executing the step-execution instruction. In FIG. 43, reference numeral 61 designates a sequence field output latch which latches the sequence field 66 having 6 bits of the microinstruction outputted from the micro ROM 12.

Reference numeral 62 designates an IRL input latch which latches the higher 3 bits of the test instruction fetched from IRL0:2 pin 16.

Reference numeral 63 designates a microsequence changing circuit which controls whether the output 67 of the sequence field output latch 61 should directly be delivered to microsequencer 64 for determining the address of the microinstruction to be executed next via signal line 68 in response to the output 65 of the IRL input latch 62, or the output 67 at the sequence field output latch 61 should externally be outputted via the signal line 68 after compulsorily converting it into "010111".

As shown in FIG. 28 and FIG. 29, the higher 2 bits of the step-execution instruction are composed of "11". The micro-sequence changing circuit 63 outputs "010111" to the signal line 68 irrespective of the value of the output 67 of the sequence field output circuit 61. As shown in FIG. 42, "010111" is the bit pattern indicating the end of the microprogram routine. After finishing execution of the microprogram, the microsequencer 64 enters into the state of standing by the following test instruction.

The output 67 of the sequence field output latch 61 is also outputted to the data operation unit 56. According to the output 67, the data operation unit 56 transfers the working stack pointer value to the regular stack pointer or transfers the working status flag to the regular program status register. To achieve this, the signal outputted from the sequence field output latch 61 to be fed to the data operation unit 56 is determined to the output 67 having the bit pattern specified by the original microinstruction. Accordingly, the data operation unit 56 executes identical operations when executing the step-execution instruction and in other cases as well.

(7.4) "Self-Diagnosing Function"

Figure 44:
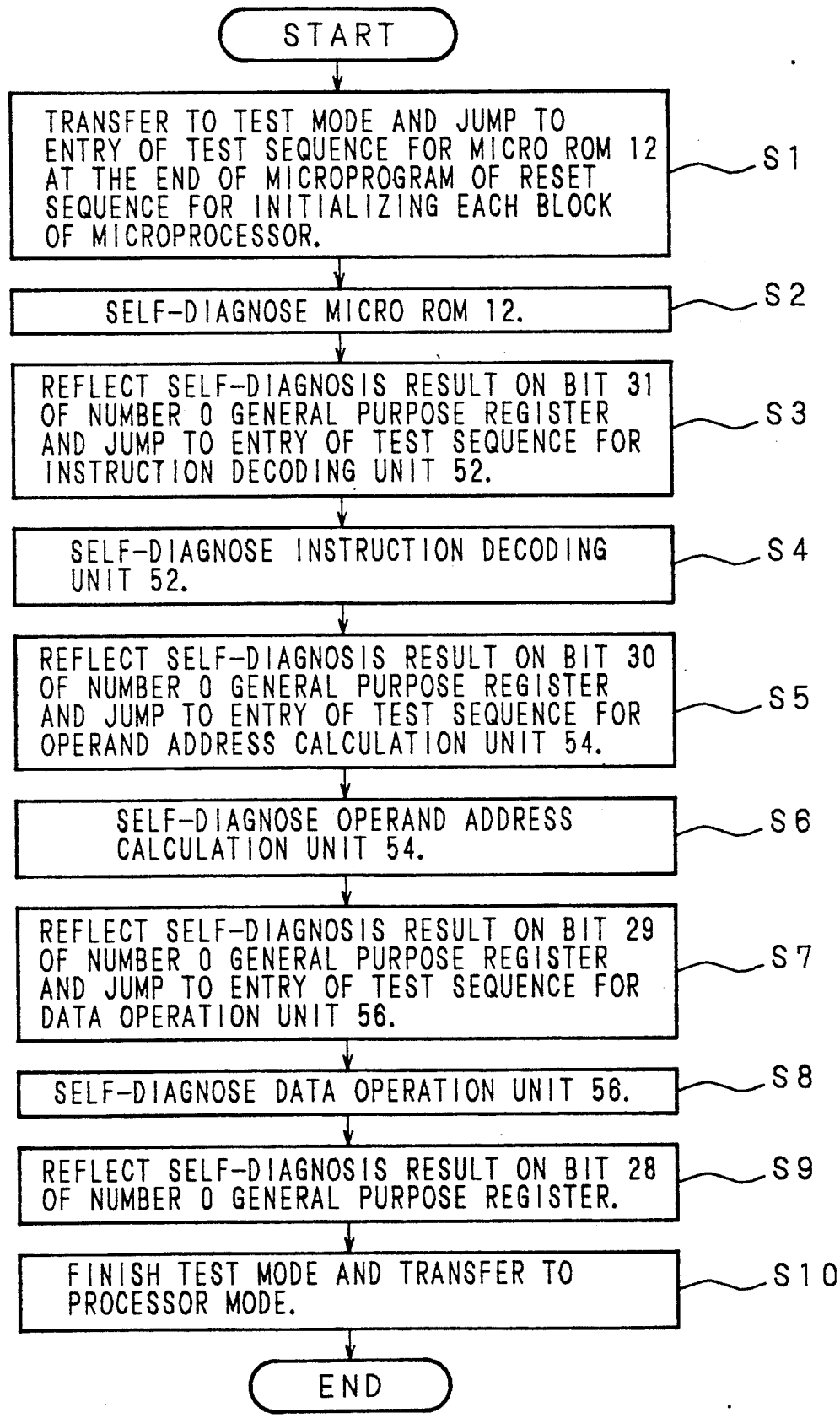
FIG. 44 is a flow chart of the microprogram routine for executing self-diagnosis of the microprocessor of the present invention.

The microprocessor 100 of the present invention incorporates a microprogram routine for executing self-diagnosis of respective function blocks of its own whenever the microprocessor 100 itself is reset in addition to the diagnosis microprogram routine activated by the test instruction. The microprocessor embodied by the present invention diagnoses the micro ROM 12, the instruction decoding unit 52, the operand address calculation unit 54, and the data operation unit 56. FIG. 44 presents the flow chart designating a sequence of the whole processes of microprogram for executing self-diagnosis.

Self-diagnosis is executed by activating the test mode of the microprocessor 100 of the present invention. To properly execute the self-diagnosis, the microprocessor 100 of the present invention incorporates two counters and four linear feedback shift registers.

The two counters operate as data generators for implementing self-diagnosis. The four linear feedback shift registers respectively operate as pseudorandom number generators or as the data compressor. The method of using a linear feedback shift register for either a pseudorandom number generator or a data compressor and the method of providing an LSI with the function of self-diagnosis by applying a linear feedback shift register are described by Tanaka in his technical report on "A logical LSI capable of executing test without aid of testers", in the Nikkei ELECTRONICS, issued on Jun. 20, 1983, on pages 124 through 133.

At the final stage of the microprogram of reset sequence for initializing respective function blocks of the microprocessor 100, the microprocessor enters into the test mode from the processor mode, and then, the diagnosis program jumps to an entry of the test sequence of the micro ROM (Step S1). As a result, self-diagnosis is executed of the micro ROM 12 (Step S2). After reflecting the result of the self-diagnosis of the micro ROM 12 on the bit 31 of the number 0 general purpose register, the diagnosis program jumps to an entry of the test sequence for diagnosing the instruction decoding unit 52 (Step S3).

Diagnosis for the instruction decoding unit 52 is executed (Step S4). Then, after reflecting the test result on the bit 30 bit of the number 0 general purpose register, the diagnosis program jumps to an entry of the test sequence for diagnosing the operand address calculation unit 54 (Step S5).

Diagnosing for the operand address calculation unit 54 is executed (Step S6). After reflecting the test result on the bit 29 of the number 0 general purpose register, the diagnosis program jumps to an entry of the test sequence for diagnosing the data operation unit 56 (Step S7).

Next, diagnosis for the data operation unit 56 is executed (Step S8). Then, after reflecting the test result on the bit 28 of the number 0 general purpose register (Step S9), the microprocessor transfers its operation mode from the test mode to the processor mode (Step S10).

(7.4.1) "Self-Diagnosing Function of Micro ROM"

Figure 45:
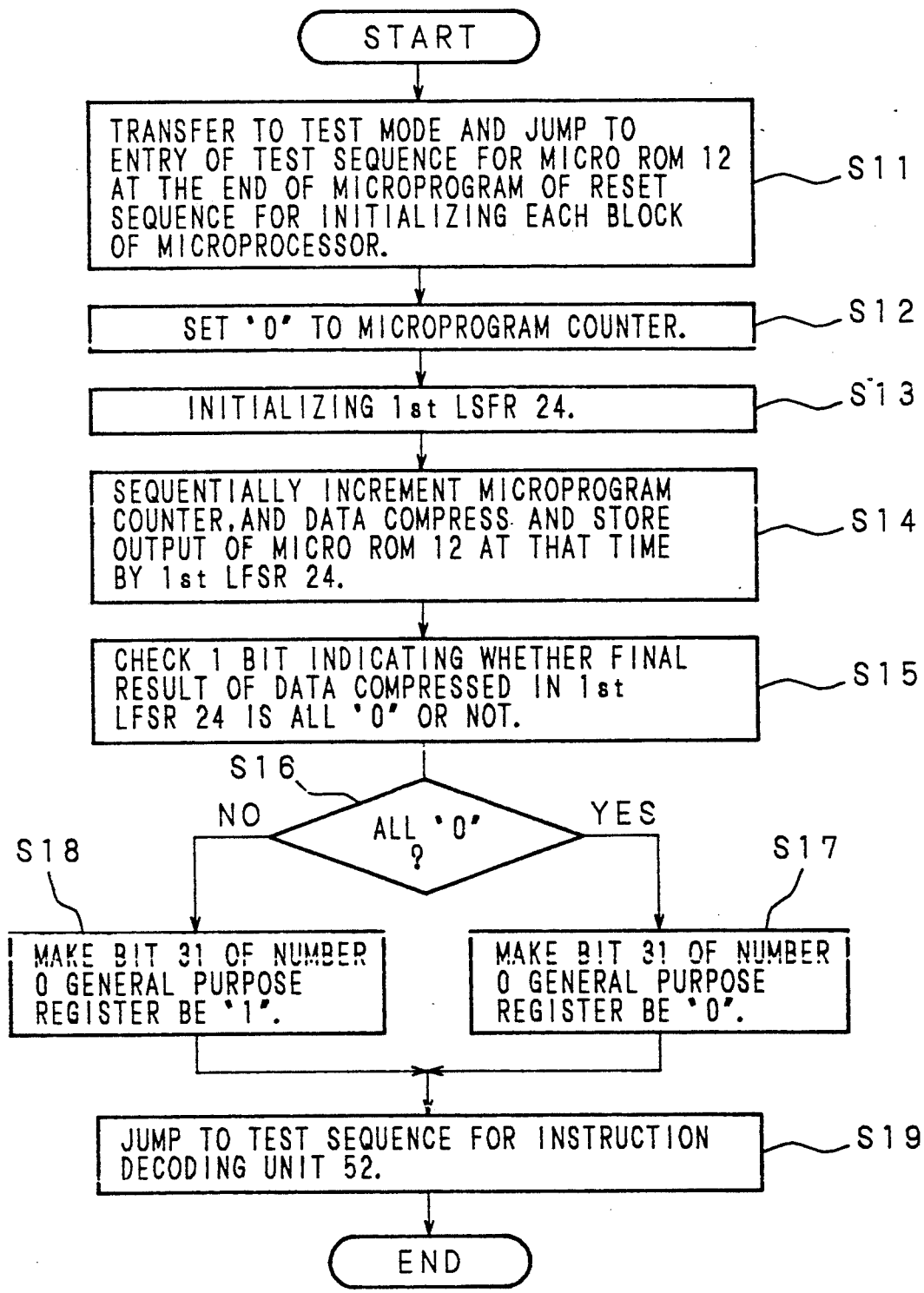
FIG. 45 is a flow chart of the microprogram routine for executing self-diagnosis of the micro ROM of the microprocessor of the present invention.

When executing self-diagnosis, the microprocessor of the present invention sequentially counts up the microprogram counter 11 from zero to sequentially read microprogram in the micro ROM 12, and then, compresses data by applying the first linear feedback shift register LFSR 24 in the output part of the micro ROM 12. The microprogram reads whether the result of the data compression has achieved the predetermined value or not. The data compression result is indicated by one-bit data and is read by the microprogram. FIG. 45 presents the flow chart of the microprogram routine used for executing self-diagnosis of the micro ROM 12 of the microprocessor 100 of the present invention.

First, operation mode transfers from the processor mode to the test mode at the end of the microprogram of the reset sequence for initializing respective function blocks of the microprocessor 100, and then, the program jumps to the entry of the test sequence of the micro ROM 12 (Step S11). Next, "0" is set to the microprogram counter 11 (Step S12), and the first linear feedback shift register LFSR 24 is initialized (Step S13).

Next, the microprogram counter 11 is sequentially incremented, and data outputted from the micro ROM 12 is compressed and accumulated by the first linear feedback shift register LFSR 24 (Step S14).

Next, one-bit data designating whether the final result of the compressed data is "0", or not is checked (Step S15). In the case where the checked result is "YES" in Step S16, the bit 31 of the number 0 general purpose register is changed to "0" (Step S17). In the case where the checked result is "NO" in Step S16, then the bit 31 of the number 0 general purpose register is changed to "1" (Step S18). Then, the diagnosis program jumps to a test sequence for the instruction decoding unit 52 (Step S19).

The first linear feedback shift register LFSR 24 in the output part of the micro ROM 12 is provided with a microaddress H'9FF (where H' designates a hexadecimal notation). When the microinstruction of the address H'9FF is executed by the step-execution instruction, the content of the first linear feedback shift register LFSR 24 is executed as the microinstruction.

(7.4.2) "Self-Diagnosing Function of Instruction Decoding Unit"

The input part of the instruction decoding unit 52 of the microprocessor 100 of the present invention is provided with a 17-bit counter 28. The second and third linear feedback shift registers LFSR 25 and LFSR 26 are provided as data compressors for the R code latching unit 14 and the A code latching unit 15, respectively.

Figure 46:
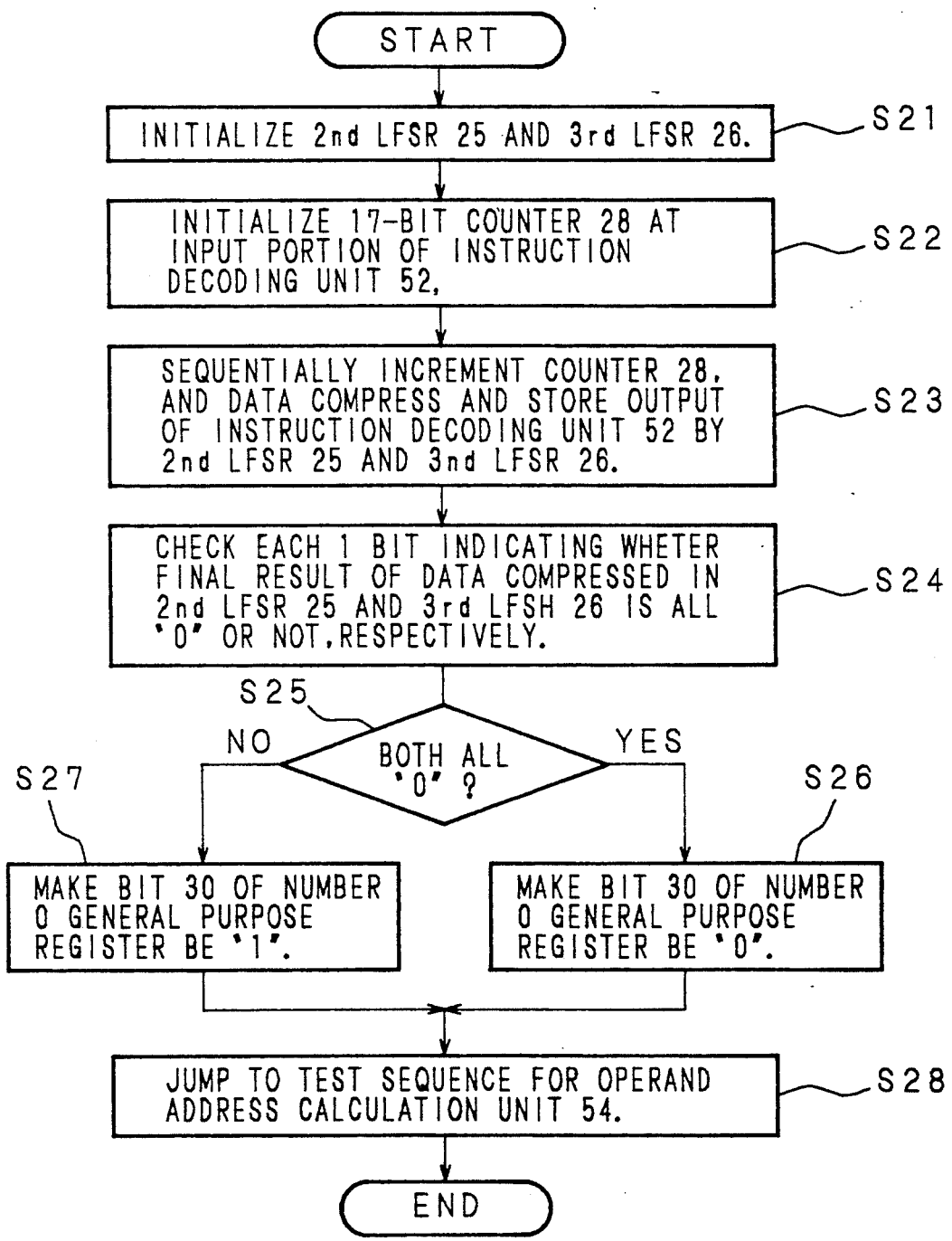
FIG. 46 is a flow chart of the microprogram routine for executing self-diagnosis of the instruction decoder of the microprocessor of the present invention.

When the microprocessor 100 is reset, the counter 28 generates all kinds of the 17-bit patterns from "B'00000 0000 0000 0000" to "B'11111 1111 1111 1111", and these bit patterns are decoded before delivering. The second and third linear feedback shift registers LFSR 25 and LFSR 26 functioning as a pair of data comprocessors of the decoded result. Whether the result of the data compression matches the predetermined value or not is indicated by one-bit data, which is then read by the microprogram. FIG. 46 presents the flow chart of the microprogram routine used for executing self-diagnosis of the instruction decoding unit 52 of the microprocessor 100 of the present invention.

First, the second and third linear feedback shift registers LFSR 25 and LFSR 26 are initialized (Step S21). Next, the 17-bit counter 28 in the input part of the instruction decoding unit 52 is initialized to "0" (Step S22).

Next, the 17-bit counter 28 is sequentially incremented. Data outputted from the instruction decoding unit 52 are compressed and accumulated by the second and third linear feedback shift registers LFSR 25 and LFSR 26 (Step S23).

Next, whether the final results of the compressed data are totally "0" or not is checked (Step S24). In the case where the checked result is "YES" in Step S25, the bit 30 of the number 0 general purpose register is changed to "0" (Step S26). In the case where the checked result is "NO" in Step S25, then the bit 30 of the number 0 general purpose register is changed to "1" (Step S27). Finally, the diagnosis program jumps to a test sequence of the operand address calculation unit 54.

(7.4.3) "Self-Diagnosing Function of Data Operation Unit and Operand Address Calculation Unit"

When the self-diagnosis is executed for the data operation unit 56 and the operand address calculation unit 54, no data is outputted and inputted to and from the exterior of the microprocessor 100 of the present invention. Data available for executing self-diagnosis of the data operation unit 56 and the operand address calculation unit 54 are obtained from either the fourth linear feedback shift register LFSR 27, which functions as a pseudorandom number generator as well as the data compressing unit, or constant ROM in the data operation unit 56, or from literal field of the microinstruction.

The result of self-diagnosis is outputted to the fourth linear feedback shift register LFSR 27 or register. After finishing self-diagnosis and resetting the microprocessor of the present invention, presence or absence of any fault in the microprocessor is judged by reading the content of the general purpose register by activating the processor instruction.

The microprocessor 100 of the present invention uses the fourth linear feedback shift register LFSR 27 as a working register. The microprogram can read the content of the fourth linear feedback shift register LFSR 27 functioning as a pseudorandom number generator or write data into this register concurrently functioning as a data compressor.

(7.5) "Scan Path"

As shown in FIG. 36, the microprocessor 100 of the present invention incorporates a scan path which is composed of the combination of the shift-path lines connected among three linear feedback shift registers LFSR 24, LFSR 25, and LFSR 26 in the output part of the micro ROM 12, R code latching unit 14, and the A code latching unit 15, respectively.

By the scan path instruction, it is possible to set optional values to these linear feedback shift registers LFSR 24, 25, and 26, and read out the values of these shift registers as well. By the scan path instruction, the microprocessor 100 of the present invention rewrites all the R code fields including OP1 field. When executing the scan-path instruction, by setting the needed values to the R code 43 and the A code 42, the microprocessor 100 can analyze the cause of failure and specify those portions containing high or low malfunctioning potential.

Using the scan-path mentioned above, the microprocessor 100 of the present invention can allow an arbitrary microinstruction to be sent to the linear feedback shift register LFSR 24 from the exterior, and then execute it.

Figure 47:
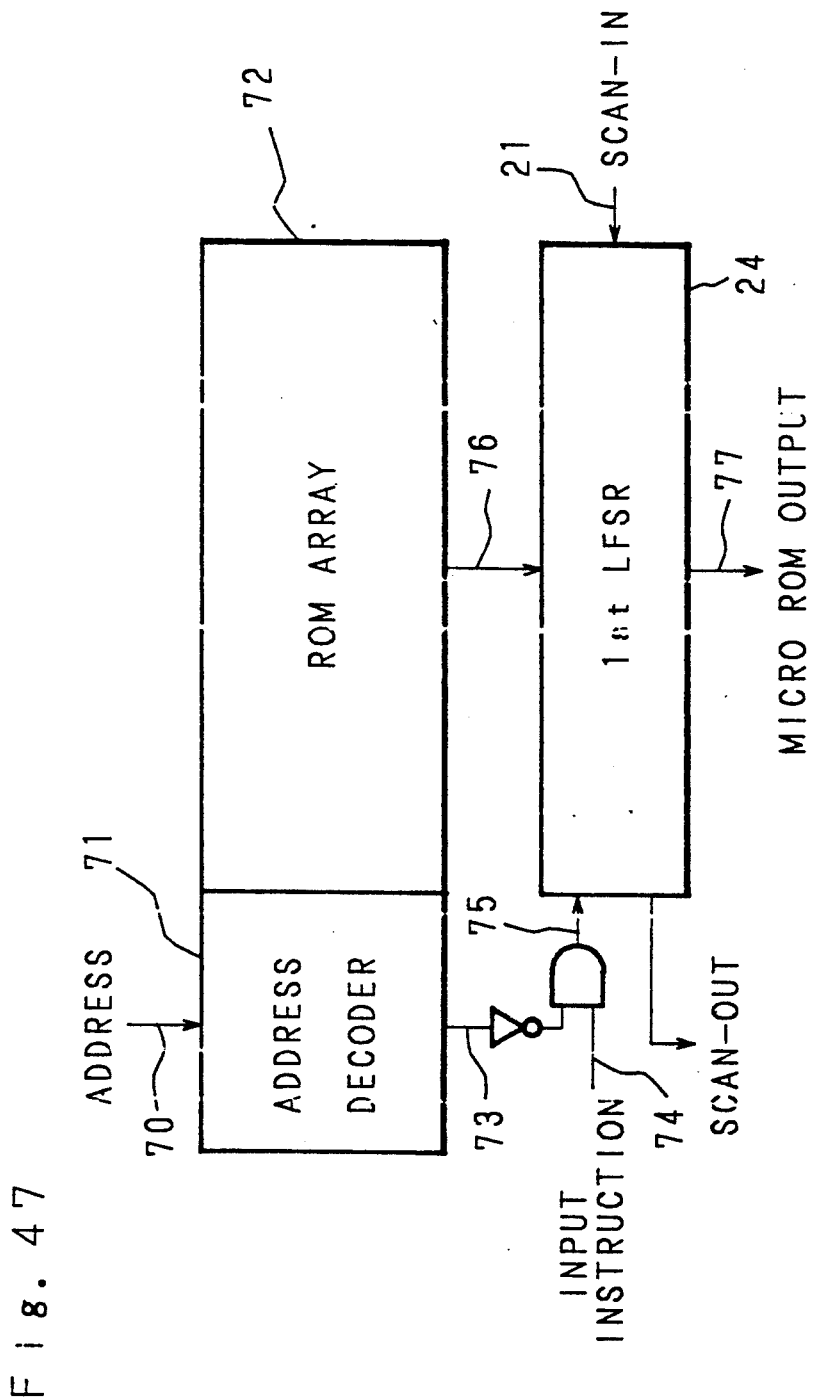
FIG. 47 is a block diagram showing an example of a construction of the micro ROM of the microprocessor of the present invention.

Next, the sequence of executing the microinstruction inputted from exterior through the scan-path is described below. FIG. 47 illustrates the simplified block diagram of the micro ROM 12 including the first linear feedback shift register LFSR 24.

Address 70 inputted from the microprogram counter 11 is decoded by the address decoder 71. A microinstruction stored in a ROM array 72 is then inputted to the first linear feedback shift register LFSR 24 as the output signal 76 from the ROM array 72. Then, at the timing when signal 75 turns to "1", the content of the first linear feedback shift register LFSR 24 is rewritten before being outputted to the microinstruction execution control circuit 13 as the output signal of the micro ROM 12.

When the address 70 is 9FF in the hexadecimal notation, the address decoder 71 turns a first linear feedback shift register counter rewriting inhibit signal 73 to "1". In the case where the address is other than 9FF, then the address decoder 71 turns the above signal 73 to "0". In consequence, even when an input instructing signal 74 of the first linear feedback shift register LFSR 24 instructs to fetch an output 76, in the case where the address 70 is 9FF in the hexadecimal notation, the signal 75 remains "0" so that no content of the first linear feedback shift register LFSR 24 is rewritten at all.

Accordingly, when the microinstruction to be executed is set to the first linear feedback shift register LFSR 24 by the scan path instruction, and then, by executing the microinstruction of a micro ROM address 9FF in the hexadecimal notation, the microinstruction scanned in the first linear feedback shift register LFSR 24 is eventually executed.

(7.6) "Transfer between Test Mode and Processor Mode"

Figure 48:
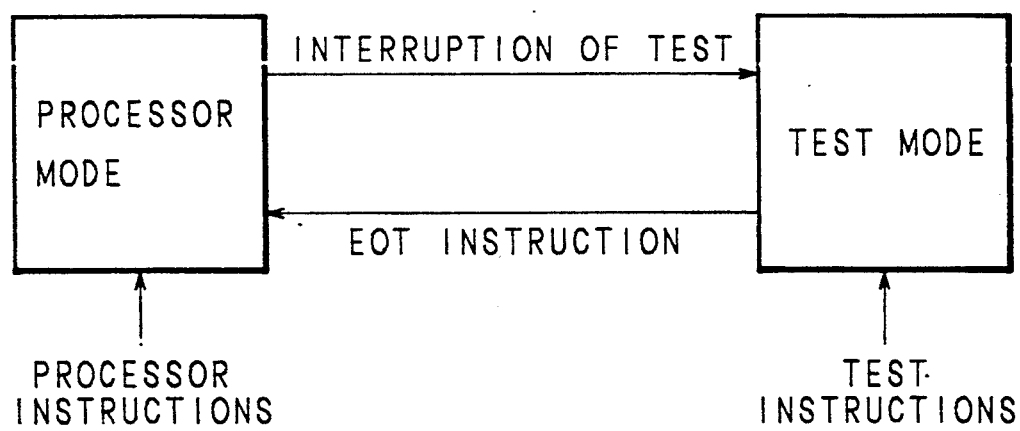
FIG. 48 is a schematic diagram showing a concept of transfer between the processor mode and the test mode.

The microprocessor 100 of the present invention can transfer the operation mode between the test mode and the processor mode without resetting the microprocessor 100 itself. Owing to this structure, when testing the microprocessor 100 of the present invention with an LSI tester, the test instruction and the processor instruction are used in combination. FIG. 48 illustrates the conceptual diagram of the transfer state of the test mode and the processor mode.

The processor mode transfers to the test mode by activating the test interruption, whereas the test mode can transfer to the processor mode by executing the dedicated test instruction (EOT instruction).

(7.6.1) "Transfer to Test Mode"

The processor mode transfers to the test mode by activating the dedicated test interrupt.

The test interrupt is accepted by applying the assertion of TEST# pin. In addition, the test interruption is an unmaskable interrupt accepted during the processor mode.

When the test interrupt is accepted, the microprocessor 100 of the present invention transfers its operation mode from the processor mode to the test mode in the state of holding the content of various registers and latching units as of the state of finishing the instruction executed immediately before the acceptance of the test interrupt, and then enters into the state of standing by the arrival of the test instruction.

(7.6.2) "Transfer to Processor Mode"

The test mode transfers to the processor mode by executing the dedicated test instruction (EOT instruction).

When executing the EOT instruction under the test mode, the microprocessor 100 of the present invention transfers its operation mode from the test mode to the processor mode while holding the content of various registers and latching units as of the value immediately before executing the EOT instruction. Then, using the content of a special working register (EB register) as the PC value, the microprocessor 100 starts to execute the processor instruction beginning from this PC value. The EB register can be operated by the microprogram, and thus, after transferring into the processor mode, the microprocessor 100 can execute the processor instruction at the address stored in the EB register by the test instruction immediately before executing the EOT instruction.

(7.7) "Operation of Testing Respective Function Blocks"

Next, an example of operation for testing respective function blocks of an the microprocessor 100 of the present invention is described below. The test operation can easily be executed by applying an LSI tester for example.

(7.7.1) "Test of Micro ROM"

The micro ROM unit 55 can be tested by testing the micro ROM 12 by the self-diagnosis at the resetting and also by executing respective instructions under the processor and test modes.

(7.7.2) "Test of Instruction Fetch Unit"

Figure 49:
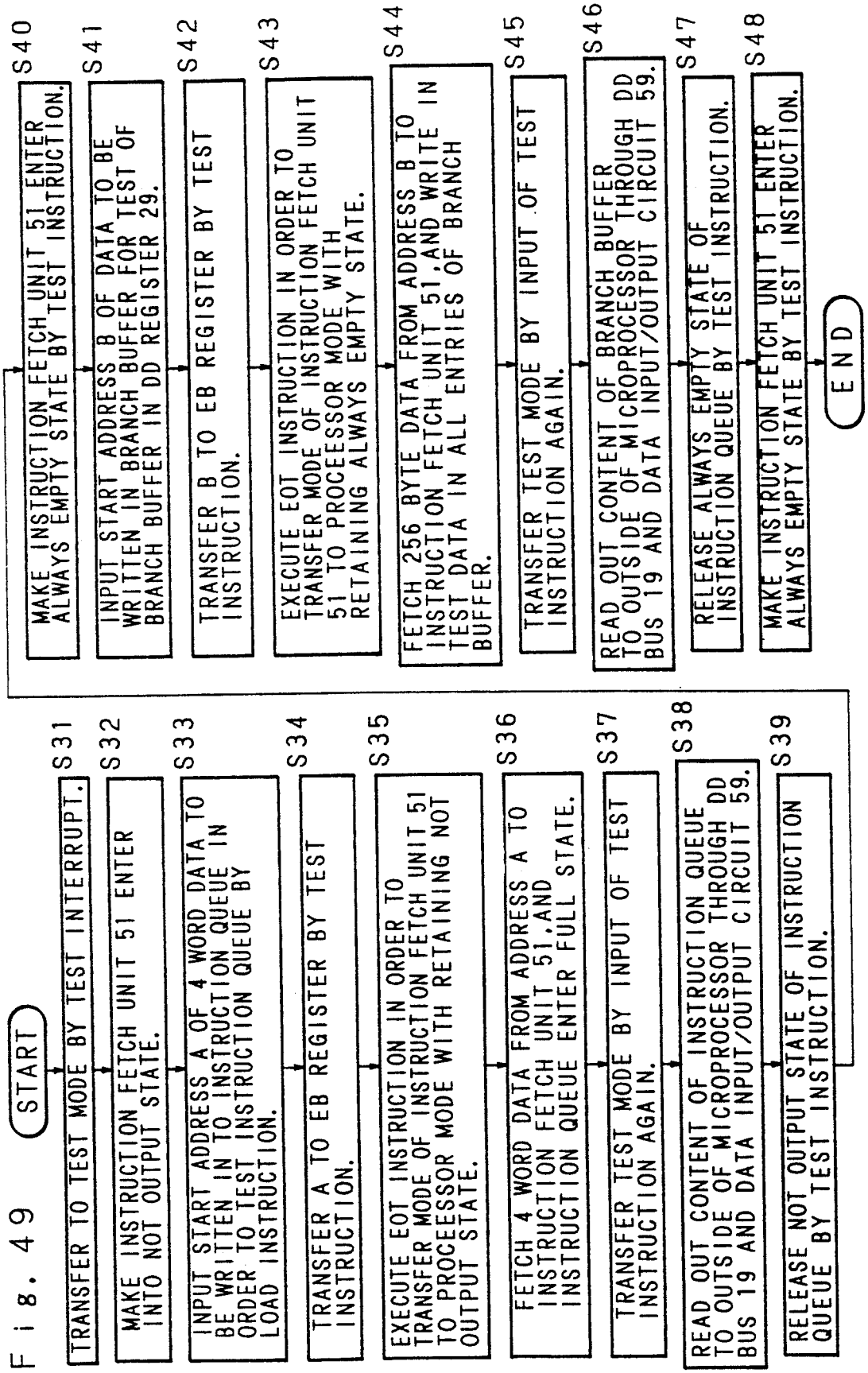
FIG. 49 is a flow chart showing an example of the test sequence of the instruction fetch unit of the microprocessor of the present invention.

The instruction fetch unit 51 has an instruction queue and a branch buffer. These two units can be tested by combining the test mode with the processor mode based on the dedicated test sequence. FIG. 49 shows the flow chart of the sequence of test applied to the instruction fetch unit 51.

The instruction queue and the branch buffer are respectively a kind of RAM. These units can be tested by executing the sequence with varying the values for writing data into many ways (like all "1", or all "0", or random numbers for example) in accordance with the flow chart shown in FIG. 49.

First, by activating the test interrupt the operation mode transfers from the processor mode to the test mode (Step S31). Next, using on the test instruction, the instruction fetch unit 51 enters into the state of retaining the instruction queue not to output signals (Step S32). Next, using on the data loading instruction and in order to test the instruction queue, a start address "A" of 4-word data, which is supposed to be written into the instruction queue, is written into the DD register 29 (Step S33). The start address "A" is transferred to the EB register by a test instruction (Step S34). Next, the operation mode transfers into the processor mode while the instruction fetch unit 51 is retaining the instruction queue at the state of not to output data (Step S35).

The instruction fetch unit 51 under the processor mode fetches the 4-word data from the address "A". In the result, the instruction queue enters into a full state (Step S36).

Now the test interruption is again activated to transfer the operation mode into the test mode (Step S37). Next, the content of the instruction queue is read out to exterior of the microprocessor 100 through the DD bus 19 and the data input/output circuit 59 in response to the test instruction (Step S38). Next, the test instruction releases the instruction queue of the instruction fetch unit 51 from the state of not to output data (Step S39). Furthermore, the test instruction makes the instruction fetch unit 51 to be a state of always empty of the instruction queue (Step S40).

Next, by the data load instruction, in order to test branch buffer, the start address "B" of the data, which is written into the branch buffer, is written into the DD register 29 (Step S41). Next, by the test instruction, the address "B" is transferred to the EB register (Step S42). Next, the EOT instruction is executed to transfer the operation mode to processor mode by retaining the instruction fetch unit 51 allowing the instruction queue in the state of always empty (Step S43).

Next, the instruction fetch unit 51 fetches the 256-byte data from the address "B" and writes the test data in all the entries of the branch buffer (Step S44).

Next, the test interruption is again activated to transfer the processor mode into the test mode (Step S45). By the test instruction, the content of the branch buffer is read out to the exterior of the microprocessor 100 via the DD bus 19 and the data input/output circuit 59 (Step S46). Next, by the test instruction, the instruction queue of the instruction fetch unit 51 is released from the state of always empty (Step S47). Finally, the microprocessor transfers its operation mode back to the processor mode in response to the EOT instruction (Step S48).

(7.7.3) "Test of Instruction Decoding Unit"

Test of the instruction decoding unit 52 is executed by decoding all the bit patterns based on the self-diagnosis at the resetting of the microprocessor 100 and also by executing various processor instructions under the processor mode.

When either specifying the faulty point or more thoroughly executing test for the malfunctioned instruction decoding unit 52, values of the second and third linear feedback shift registers LFSR 25 and LFSR 26 provided in the R code latching unit 14 and the A code latching unit 15 are respectively read by the scan path instruction.

(7.7.4) "Test of Operand Address Calculation Unit"

In addition to the simplified test based on the self-diagnosis at the resetting of the microprocessor 100, detailed test can also be applied to the operand address calculation unit 54 under either the test mode or the processor mode.

Under the test mode, very detailed test can be done or the faulty spot can be specified by setting various values of the A code 42 to the third linear feedback shift register LFSR 26 of the A code latching unit 15 by the scan path instruction.

Figure 50:
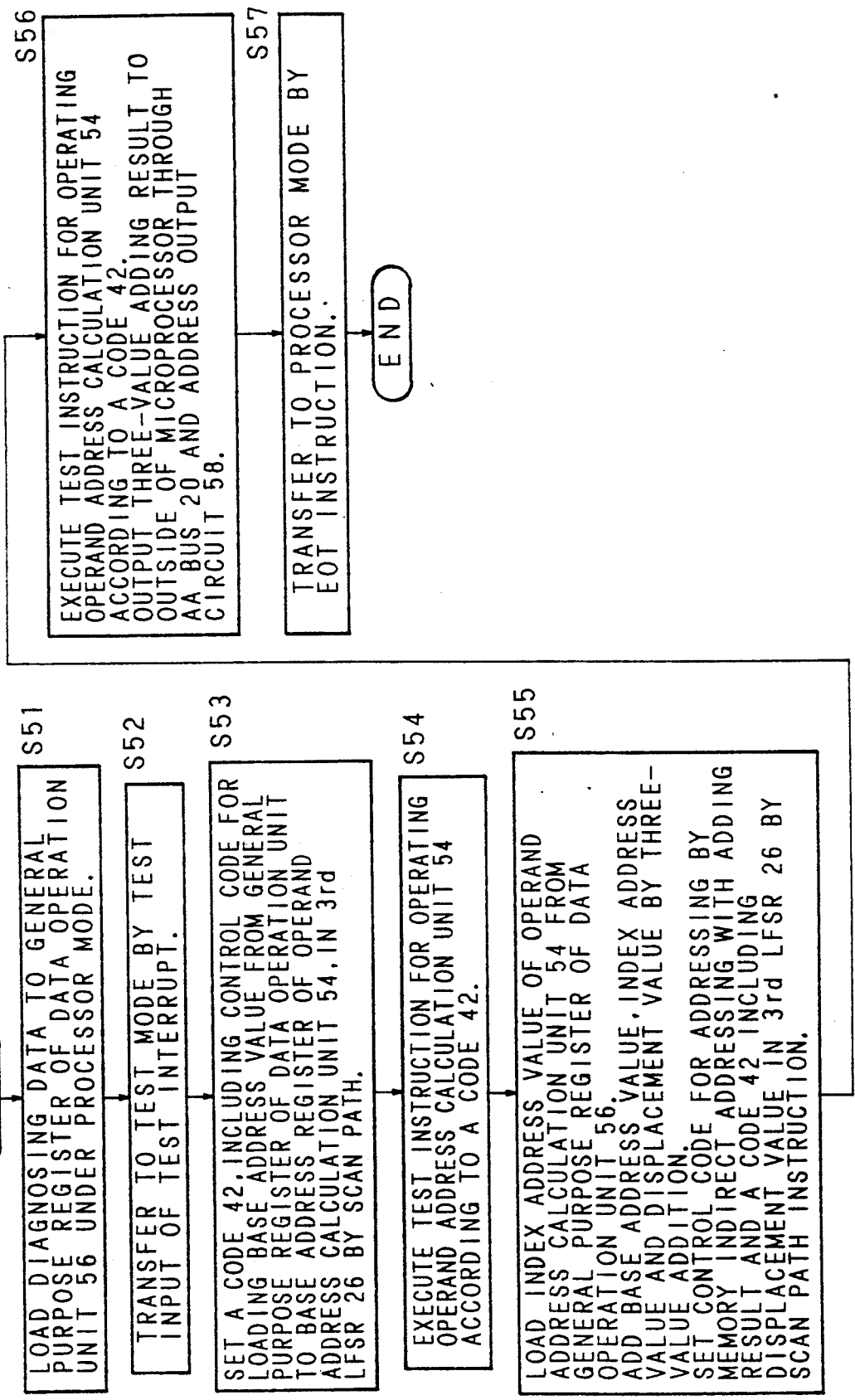
FIG. 50 is a flow chart showing an example of the test sequence of the address calculation unit of the microprocessor of the present invention.

FIG. 50 shows the flow chart of an example of the test operation applied to the operand address calculation unit 54 by combining the test mode with the processor mode.

The test result of the operand address calculation unit 54 can be read out to exterior of the microprocessor 100 via the AA bus 20 and the address output circuit 58 by specifying the memory indirect addressing mode by the A code 42. Detailed test can be executed for the operand address calculation unit 54 by executing those operations shown in FIG. 50 in connection with various data.

First, under the processor mode, test data is loaded into the general purpose register of the data operation unit 56 (Step S51). Then, the operation mode transfers to the test mode by the test interrupt (Step S52).

Next, the A code 42 including control code for loading the base address value into the basic address register of the operand address calculation unit 54 from the general purpose register of the data operation unit 56 is set to the second linear feedback shift register LFSR 26 through the scan path (Step S53).

Next, the test instruction for operating the operand address calculation unit 54 is executed according to the A code 42 (Step S53).

Next, when Step S55 is entered, an index address value is loaded to an index address register of the operand address calculation unit 54 from the general purpose register of the data operation unit 56, and then the base address value, index address value, and the displacement value are applied to three-values addition. Then, the A code 42 including a control code which performs memory indirect addressing by the result of addition and including a displacement value is set to the third linear feedback shift register LFSR 26 by the scan path instruction (Step S55). Next, the test instruction for operating the address calculation unit 54 is executed according to the A code 42, and then the result of the three-value addition is outputted to the exterior of the microprocessor 100 via the AA bus 20 and the address output circuit 58 (Step S56). Finally, the microprocessor 100 transfers its own operation mode to the processor mode by executing the EOT instruction (Step S57).

(7.7.5) "Test of Data Operation Unit"

Not only can a simplified test be done by applying self-diagnosis at the resetting, but it is also possible to more thoroughly test the data operation unit 56.

Figure 51:
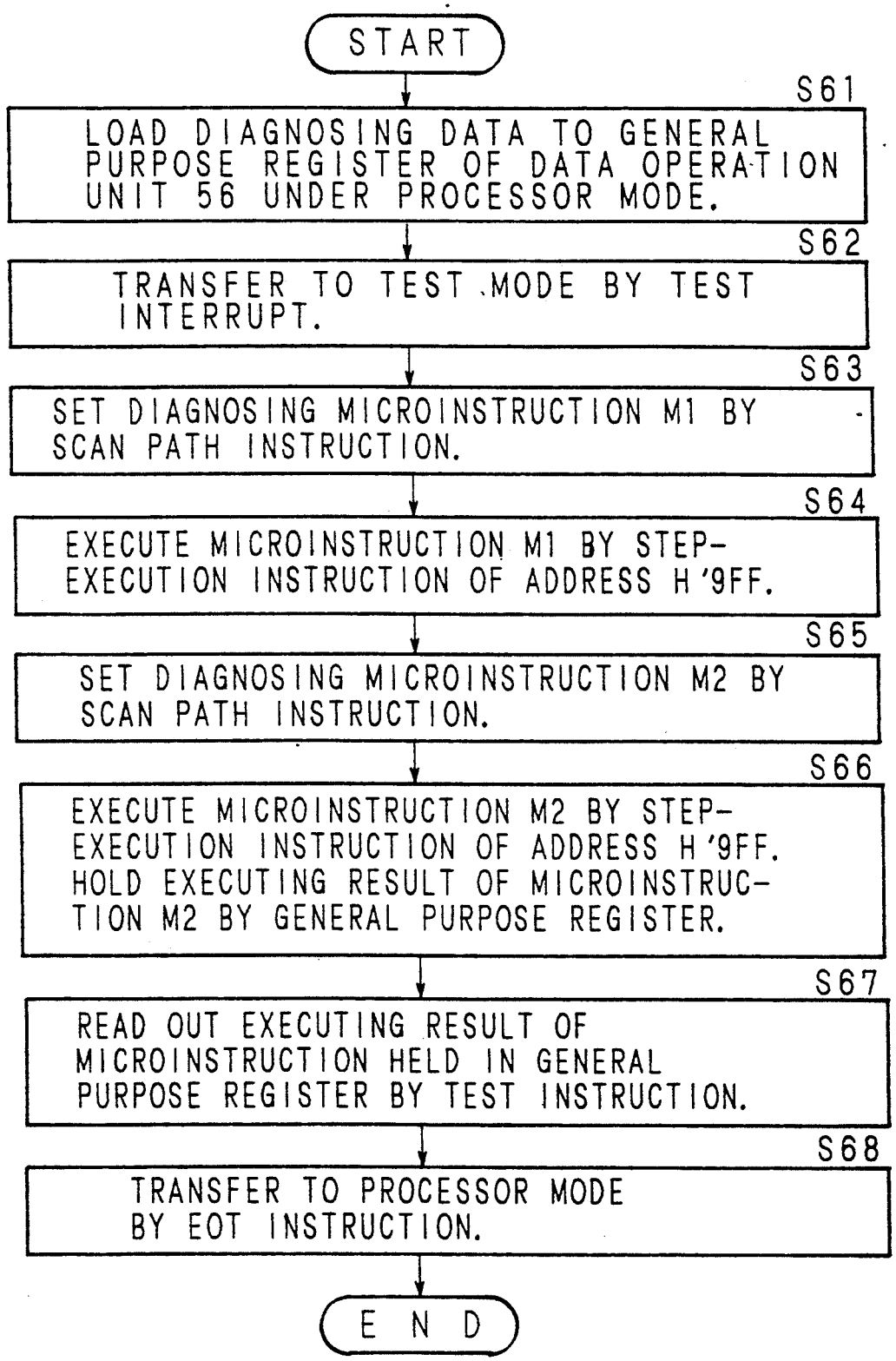
FIG. 51 is a flow chart showing an example of the operation for specifying the cause of failure of the data operation unit of the microprocessor of the present invention by scan path instruction.

Under the test mode, the data operation unit 56 can be easily tested and the cause of failure determined by setting various values of the R code 43 to the second linear feedback shift register LFSR 35 of the R code latching unit 14 by the scan path instruction. When specifying the cause of the malfunction of the data operation unit 56, an arbitrary microinstruction is set from exterior to the first linear feedback shift register LFSR 24 in accordance with the scan path instruction to be executed. Then, various microinstructions, which are not present in the micro ROM 12, are executed so that very flexible tests can be executed. FIG. 51 shows the flow chart of the sequential operations for specifying the cause of the fault of the data operation unit 56 based on the microinstruction set to the first linear feedback shift register LFSR 24.

First, under the processor mode, data used for testing is loaded to the general purpose register of the data operation unit 56 (Step S61). Then, after activating the test instruction, the operation mode transfers to the test mode (Step S62).

Next, the fault diagnosing microinstruction M1 is set to the first linear feedback shift register LFSR 24 by the scan path instructions (Step S63). Next, by the step-execution instruction for executing the microinstruction of the address H'9FF (where H' designates the hexadecimal notation), the microinstruction M1 is executed (Step S64).

Next, by the scan path instructions, the fault diagnosing microinstruction M2 is set to the first linear feedback shift register LFSR 24. Then, by the step-execution instruction for executing the microinstruction of the address H'9FF, the microinstruction M2 is executed (Step S66).

Next, by the test instruction, an executed result of the microinstruction M2 held in the general purpose register is read out to the exterior of the microprocessor 100. At last, the EOT instruction is executed to transfer the operation mode to the processor mode.

Figure 52:
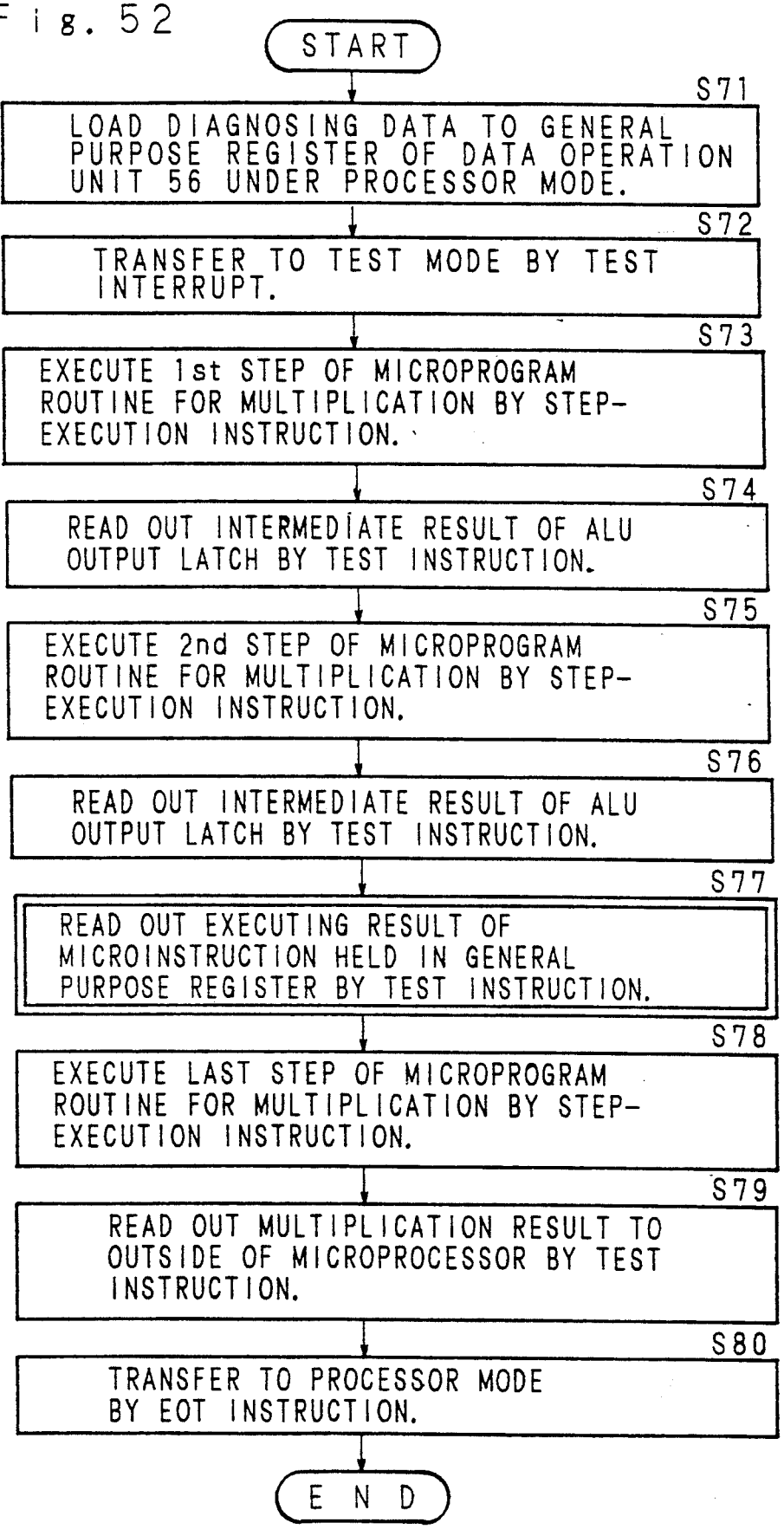
FIG. 52 is a flow chart showing an example of the operation for specifying the cause of failure of the data operation unit of the microprocessor of the present invention by the step-execution instruction.

FIG. 52 shows the flow chart of an example of the sequence for specifying the cause of fault present in the data operation unit 56 by executing the microprogram step by step according to the step-execution instruction.

First, under the processor mode, data used for the test is loaded in the general purpose register of the data operation unit 56 (Step S71).

Next, the operation mode transfers to the test mode by the test interrupt (step S72). Then, by the step-execution instruction, a first step of the microprogram routine for executing multiplication is executed (Step S73). An intermediate result of the ALU output latch is read out to exterior of the microprocessor 100 by the test instruction (Step S74).

Next, the second step of the microprogram routine for executing the multiplication is executed (Step S75). An intermediate result of the ALU output latch is read out to exterior of the microprocessor by the test instruction (Step S76).

Those sequential processes mentioned above are repeatedly executed (Step S77).

Next, by the step-execution instruction, the last step of the microprogram routine for executing multiplication is executed (Step S78).

Next, by the test instruction, the result of multiplication is read out to exterior of the microprocessor 100 (Step S79). Finally, the microprocessor 100 executes the EOT instruction so that it transfers to the processor mode (Step S80).

According to the above example, the intermediate results are sequentially output to the exterior of the microprocessor 100 by executing the microprogram routine for executing multiplication step by step. In the case where any fault occurs to obstruct the microprogram routine from correctly executing multiplication, the microprocessor 100 of the present invention can easily detect and specify and specify the cause of fault by executing the above test processes to determine if the arithmetic operation performed for the ALU malfunctions or if the circuit transferring the operation result malfunctions while executing the final step of the microprogram routine, for example.

(8) "Other Embodiments of the Present Invention"

In the abovementioned embodiment, the step-execution instruction can be executed only under the test mode, but it can be added an instruction which executed one step of the microinstruction as like as step-execution instruction to the processor instruction by extending the entry address specifying field of the microprogram routine of the R code 43 as shown in FIG. 37 to 12 bits.

Also, it is possible to constitute that a register which stores a bit for indicating step execution mode being underway in the microprocessor 100, so that the microprogram is executed step by step in the case where abovementioned bit is being set.

Furthermore, in the abovementioned embodiment, function blocks which can be easily tested by the test instruction are limited within a part of the function blocks constituting the microprocessor 100. However, it is possible to support a test instruction for diagnosing other function blocks such as the PC operation unit 53 and the like. Also, other various kinds of test instructions and formats can be added.

As is clear from the foregoing description, the microprocessor 100 of the present invention incorporates test instructions for diagnosing the microprocessor itself in addition to normal processor instruction which executes data operations at a high speed by pipeline processing. Furthermore, since the microprocessor 100 of the present invention makes it possible to execute various test instructions under the test mode, it securely facilitates design of test program applicable to the microprocessor, and as a result, man-hours needed for designing the test program is significantly reduced in comparison with any conventional microprocessor.

Furthermore, the microprocessor 100 of the present invention can execute an optional microinstruction being set in the shift register at the output portion of the micro ROM from outside of the microprocessor by the scan in instruction. Accordingly, for diagnosing of the microprocessor in which faults generates at any points, a high flexibility test program can be designed by using the abovementioned function, so that designing the test program is easy and the man-hours needed for designing the test program are reduced. Especially, when specifying fault point in the case where the yield rate of microprocessors remains low when such microprocessors contain any portion causing a fault to easily occur at high rate because of too small a margin in the mask pattern design of LSI, the test program is easily designed in response to the situation of the fault, so that time for designing test program becomes short and various test program can be designed with few man-hours. Accordingly, operation of specifying fault point can be executed with high efficiency.

Also, one address is allocated to the shift register at the output portion of the micro ROM, thereby an optional microinstruction can be executed by loading it from outside and storing it in the shift register. By this reason, increasing hardware volume is insignificant because the microinstruction is loaded from outside and stored in the shift register to be executed by the same control method as well as the microinstructions stored in the micro ROM.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A microprocessor comprising:
   storage means for storing microinstructions in a plurality of addresses including a first microinstruction at a first address, said storage means being a read-only memory;
   an operation unit, wherein said operation unit executes operations with data stored in said operation unit according to microinstructions applied at a microinstruction input to said operation unit;
   a register coupled to said operation unit, said storage unit, and an external microinstruction input bus, for storing a second microinstruction read from said external microinstruction input bus, said register coupled to said storage unit such that said register is addressable as a second address in said storage unit; and
   means coupled to said operation unit and said storage unit, for applying said first microinstruction stored at said first address to said microinstruction input of said operation unit when the microprocessor is executing a first macroinstruction, and for applying said second microinstruction stored at said second address to said microinstruction input of said operation unit when the microprocessor is executing a second macroinstruction.

2. A microprocessor comprising:
   storage means for storing microinstructions in a plurality of addresses including a first microinstruction at a first address, said storage means being a read-only memory;
   a microprogram counter for pointing to an address of a microinstruction in said storage means to be executed;
   an operation unit, wherein said operation unit executes an operation with data stored in said operation unit according to a microinstruction applied at microinstruction input to said operation unit;
   a register coupled to said operation unit, said storage unit, and an external microinstruction input bus, for storing a second microinstruction, said register loaded from one of an address in said storage means or said external microinstruction input bus;

a first control unit coupled to said microinstruction input and said register for applying said second microinstruction to said microinstruction input; and a second control unit coupled to said microprogram counter and said storage means for storing said first microinstruction from said storage means into said register when said microprogram counter points to said first address, and which does not store said first microinstruction from said storage means into said register when said microprogram counter points to a second address.

3. A self-testing microprocessor, wherein an address value of a plurality of address values is applied to an address input of a read-only memory containing a plurality of microinstructions, each of which is located at an address in the read-only memory and when output at a read-only memory output, causes a particular operation to be performed by circuits within the self-testing microprocessor, the self-testing microprocessor comprising:

means for accepting a test signal;

means for accepting a test microinstruction, where said test microinstruction is not a microinstruction in the plurality of microinstructions contained in the read-only memory;

means for detecting a test address value at the address input of the read-only memory and outputting a test address presence signal to a test address presence line when said test address is detected; and microinstruction substitution means, coupled to said means for accepting a test signal, said means for accepting a test microinstruction, and said test address presence line, for substituting said test microinstruction for a microinstruction in the read-only memory at the read-only memory output when said test signal and said test address presence signal is asserted.

4. A self-testing microprocessor according to claim 3, wherein microinstruction substitution means further comprises:

invertor means coupled to said test address presence line, for asserting a test address absence signal when said test address presence signal is not asserted, said invertor means de-asserting said test address absence signal when said test address presence signal is asserted;

ANDing means, coupled at a first input to said invertor means, for asserting an ANDed signal when said test address absence signal and an input instruction signal applied at a second input to said ANDing means are both asserted; and means, coupled to an output of said ANDing means, for overwriting a test microinstruction with a microinstruction from the read-only memory when said ANDed signal is asserted and for preventing said microstruction from overwriting said test microinstruction when said ANDed signal not is asserted.

5. A self-testing microprocessor according to claim 4, wherein said means for overwriting comprises a register with a parallel input for microinstructions read from the read-only memory and a serial input for test microinstructions.

* * * * *